United States Patent [19]

Way

[11] 3,820,083

[45] June 25, 1974

[54] CODED DATA ENHANCER, SYNCHRONIZER, AND PARITY REMOVER SYSTEMS

[75] Inventor: John L. Way, La Canada, Calif.

[73] Assignee: Bell & Howell Company, Chicago, Ill.

[22] Filed: Jan. 5, 1973

[21] Appl. No.: 321,197

Related U.S. Application Data

[63] Continuation-in-part of Ser. No. 278,138, Aug. 4, 1972.

[52] U.S. Cl. 340/172.5, 178/69.5 R, 340/146.1 AG

[51] Int. Cl. .......... G06f 11/10

[58] Field of Search ...... 178/69.5 R; 340/146.1 AG, 340/146.1 AV, 172.5, 174.1

[56] References Cited

UNITED STATES PATENTS

| | | | |
|---|---|---|---|
| 3,456,238 | 7/1969 | Peddle | 340/146.1 AG |
| 3,484,745 | 12/1969 | Sourgens | 340/146.1 AG |
| 3,491,337 | 1/1970 | Guzak et al. | 340/146.1 AG |
| 3,549,804 | 12/1970 | Greenspan | 178/69.5 R |
| 3,587,043 | 6/1971 | Mengani | 178/69.5 R |
| 3,593,160 | 7/1971 | Moore, Jr. | 178/69.5 R |
| 3,619,662 | 11/1971 | Vachon | 178/69.5 R |
| 3,621,140 | 11/1971 | Griffiths | 178/69.5 R |

*Primary Examiner*—Paul J. Henon
*Assistant Examiner*—Michael Sachs
*Attorney, Agent, or Firm*—Benoit Law Corporation

[57] ABSTRACT

A first stream of binary words is accompanied by a first series of clock pulses, each word having n bits and being accompanied by n clock pulses. To enhance binary transitions in this stream of binary words, a second series of clock pulses having (n+1) clock pulses for each n clock pulses of the first series is provided. A second stream of binary words in which each binary word of the first stream is accommodated within n clock pulses of the (n+1) clock pulses of the second series is also provided. Binary words in the second stream are then provided with parity bits during clock pulses outside the n clock pulses within which each binary word is accommodated in the second stream.

Apparatus for synchronizing bits of binary data have selectively actuable equipment for regenerating received data bits. A phase lock loop generates clock pulses synchronized with the regenerated bits. The phase lock loop includes a digital counter for generating a phase reference signal in the phase lock loop. The bit regenerating equipment is actuated during the occurrence of a center portion of each received bit and in response to the generated clock pulses and a predetermined counting state of the digital counter means.

37 Claims, 24 Drawing Figures

CODED DATA ENHANCER, SYNCHRONIZER, AND PARITY REMOVER SYSTEMS

CROSS-REFERENCES

This is a continuation-in-part of U.S. Pat. Application Ser. No. 278,138, filed Aug. 4, 1972, by John L. Way, and assigned to the present assignee.

Reference is also made to the U.S. Pat. Application Ser. No. 278,137, filed Aug. 4, 1972, by William H. Spencer, assigned to the subject assignee and herewith incorporated by reference herein. In particular, the coded data enhancer systems, with or without bit synchronizer, may be operated in conjunction with the parity bit remover system of said Spencer patent application.

A playback amplification system with signal equalization and detection is disclosed and claimed in the copending Patent Application Ser. No. 321,198, filed by David B. Gish of even date herewith, assigned to the present assignee and incorporated by reference herein.

BACKGROUND OF THE INVENTION

1. Field of the Invention

The subject invention relates to the field of pulse code modulation and, more specifically, to a synchronization of data bits, to an enhancement of binary transitions, and to a removal of parity bits from binary words.

2. Description of the Prior Art

In an effort to reduce bandwidth requirements of pulse code modulation systems, a number of codes have been developed which are characterized by a small number of binary transitions. While these codes are advantageous for this reason, they often could not be employed because they were not self-clocking and because they could not be satisfactorily recorded and reproduced.

Similarly, published methods and apparatus were not suitable for an identification or removal of parity bits from continuous streams of binary words. Factors which contribute to this problem include the lack of an indication as to the start of each binary word in the continuous stream and the identity of parity bits with data bits as far as pulse shape is concerned.

Improvements are also needed in the field of bit synchronizers to avoid faulty reproduction of transmitted or played back data bits and to provide for an accurate regeneration of clock pulses.

SUMMARY OF THE INVENTION

It is an object of this invention to overcome the above mentioned disadvantages.

It is an object of this invention to enhance binary transitions in streams of binary words.

It is an object of this invention to provide advanced methods and apparatus for enhancing binary transitions in a stream of binary words.

It is a further object of this invention to provide improved binary data recording and playback methods and apparatus.

It is also an object of this invention to provide advanced systems for synchronizing bits of binary data.

It is a further object of this invention to provide advanced systems for synchronizing and modifying binary data.

It is a related object of this invention to provide advanced systems for synchronizing and removing parity bits from binary words including parity bits.

It is another object of this invention to provide methods and apparatus for removing parity bits from continuous stream of binary words having word bits and parity bits.

It is a related object of this invention to provide methods and apparatus for identifying parity bits in continuous streams of binary words having word bits and parity bits.

Other objects of this invention will become apparent in the further course of this disclosure.

From one aspect thereof, this invention resides in a method of enhancing binary transitions with the aid of a register in a first stream of binary words accompanied by a first series of clock pulses, each word having n bits and being accompanied by n clock pulses. The invention according to this aspect resides, more specifically, in the improvement comprising in combination the steps of providing a second series of clock pulses having $(n+1)$ clock pulses for each n clock pulses of the first series, providing a second stream of binary words in which each binary word of the first stream is accommodated within $n$ clock pulses of the $(n+1)$ clock pulses of the second series, and providing binary words in the second stream with parity bits during clock pulses outside the $n$ clock pulses within which each binary word is accommodated in the second stream. According to the invention, the second stream of binary words including said parity bits is provided by transferring each binary word of said first stream into said register, determining the parity of each binary word during transfer of that binary word into said register, providing each binary word in said register with a parity bit corresponding to the determined parity of that binary word, and shifting each binary word with parity bit out of said register with said second series of clock pulses.

In accordance with a preferred embodiment of the subject invention, a determination is made during the transfer of each word into the register whether the particular word has an even number or an odd number of binary bits of a predetermined kind, and each word in the register is provided with a first kind of parity bit when the particular word has an even number of binary bits of said predetermined kind, and with a second kind of parity bit when the particular word has an odd number of binary bits of said predetermined kind.

From another aspect thereof, this invention resides in apparatus for enhancing binary transitions in a first stream of binary words accompanied by a first series of clock pulses, each word having n bits and being accompanied by n clock pulses. The invention according to this aspect resides, more specifically, in the improvement comprising, in combination, means for generating a second series of clock pulses having $(n+1)$ clock pulses for each n clock pulses of the first series, means for generating a second stream of binary words in which each binary word of the first stream is accommodated within n clock pulses of said $(n+1)$ clock pulses of the second series, and means for providing binary words in the second stream with parity bits during clock pulses outside the n clock pulses within which each binary word is accommodated in the second stream. According to the invention, said means for generating a second stream of binary words include register means, means connected to said register means for transferring binary words of said first stream into said register means, and means connected to said means for generating a second series of clock pulses and to said register means for shifting each binary word with parity bit out of said register means with said second series of clock pulses, and said means for providing binary words in said second stream with parity bits include means for determining the parity of each binary word during said transfer of that binary word into said register means, and means connected to said register means and to said parity determining means for providing each binary word in said register means with a parity bit corresponding to the determined parity of that binary word.

From another aspect thereof, this invention resides in apparatus for synchronizing bits of binary data and, more specifically, resides in the improvement comprising, in combination, means for receiving the bits, selectively actuable means connected to the bit receiving means for regenerating the received bits, phase lock loop means connected to the bit receiving means for generating clock pulses synchronized with the regenerated bits, these phase lock loop means including digital counter means for generating a phase reference signal in the phase lock loop, and means connected to the phase lock loop means for actuating the bit regenerating means during the occurrence of a center portion of each received bit and in response to the generator clock pulses and a predetermined counting state of the digital counter means.

From another aspect thereof, this invention resides in apparatus for synchronizing and modifying binary data and, more specifically, resides in the improvement comprising, in combination, means for receiving the bits, selectively actuable means connected to the bit receiving means for regenerating the received bits, means connected to the regenerating means for modifying the regenerated bits, phase lock loop means connected to the bit receiving means for generating first clock pulses synchronized with the regenerated bits, these phase lock loop means including digital counter means for generating a phase reference signal in the phase lock loop and for operating the bit modifying means, means connected to the phase lock loop means for actuating the bit regenerating means during the occurrence of a center portion of each received bit in response to the generated first clock pulses and a predetermined counting state of the digital counter means, and means connected to the phase lock loop means for generating second clock pulses synchronized with the modified bits.

From another aspect thereof, this invention resides in apparatus for synchronizing and removing parity bits from binary words including parity bits. The invention according to this aspect resides, more specifically, in the improvement comprising, in combination, means for receiving the bits including parity bits, selectively actuable means connected to the bit receiving means for regenerating the received bits including the parity bits, means connected to the bit regenerating means for identifying parity bits in the regenerated bits, means for removing identified parity bits from the regenerated bits, means connected to the removing means for expanding the regenerated bits from which parity bits have been removed into the time periods of the removed parity bits, phase lock loop means connected to the bit receiving means for generating first clock pulses synchronized with the regenerated bits including the parity bits, these phase lock loop means including digital counter means for generating a phase reference signal in the phase lock loop and for operating the parity bit identifying means, means connected to the phase lock loop means for actuating the bit regenerating means in response to the generated clock pulses and a predetermined counting state of the digital counting means, and means connected to the phase lock loop means for operating the expanding means and for generating second clock pulses synchronized with the expanded bits.

From another aspect thereof, this invention resides in a method of removing parity bits from a first continuous stream of binary words having $n$ word bits and $p$ parity bits per word and being accompanied by a first series of clock pulses. The invention according to this aspect resides, more specifically, in the improvement comprising in combination the steps of identifying parity bits in the first stream of binary words by determining for $m(m+p)$ bits from the first stream of binary words whether the number of binary "one" bits in any set of $m(n+p)$ bits is even or odd, wherein $m$ is a positive integer greater than one, removing the identified parity bits by transferring in response to said determination only $n$ bits from each set of $(n+p)$ bits of the $m(n+p)$ bits, providing a second continuous stream of binary words in which the binary words of the first stream are expanded into the time periods of the removed parity bits, and providing a second series of clock pulses adapted to the expanded binary words in the second stream.

From another aspect thereof, this invention resides in a method of identifying parity bits in a continuous stream of binary words having $n$ word bits and $p$ parity bits per binary word, the parity bits in different binary words being situated at corresponding locations, and the number of binary "one" word and parity bits being odd in essentially each word. The invention according to this aspect resides, more specifically, in the improvement comprising in combination the steps of determining for $m(m+p)$ bits from the stream of binary words whether the number of binary "one" bits in any set of $(n+p)$ bits of the $m(n+p)$ bits is even or odd, wherein $m$ is a positive integer greater than one, and identifying the parity bits in the $m(n+p)$ bits on the basis of said corresponding locations in response to a determination that the number of binary "one" bits in any set of $(n+p)$ bits of the $m(n+p)$ bits is even or odd.

From another aspect thereof, this invention resides in apparatus for removing parity bits from a first continuous stream of binary words having $n$ word bits and $p$ parity bits per word and being accompanied by a first series of clock pulses. The invention according to this aspect resides, more specifically, in the improvement comprising, in combination, first means for identifying parity bits in the first stream of binary words, these first means including second means for determining for $m(n+p)$ bits from the first stream of binary words whether the number of binary "one" bits in any set of $(n+p)$ bits of the $m(n+p)$ bits is even or odd, wherein $m$ is a positive integer greater than one, third means connected to the first means for removing the identified parity bits, these third means including fourth means for transferring in response to said determination only $n$ bits from each set of $(n+p)$ bits of the $m(n+p)$ bits, fifth means connected to the third means for providing a second continuous stream of binary words in which the binary words of the first stream are expanded into the time periods of the removed parity bits, and sixth means for providing a second series of clock pulses adapted to the expanded binary words in the second stream.

From yet another aspect thereof, this invention resides in apparatus for identifying parity bits in a continuous stream of binary words having $n$ word bits and $p$ parity bits per binary word, the parity bits in different binary words being situated at corresponding locations, and the number of binary "one" word and parity bits being odd in essentially each word. The invention according to this aspect resides, more specifically, in the improvement comprising, in combination, first means for determining for $m(n+p)$ bits from the stream of binary words whether the number of binary "one" bits in any set of $(n+p)$ bits of the $m(n+p)$ bits is even or odd, wherein $m$ is a positive integer greater than one, and second means connected to the first means for identifying the parity bits in the $m(n+p)$ bits on the basis of said corresponding locations in response to a determination that the number of binary "one" bits in any set of $(n+p)$ bits of the $m(n+p)$ bits is even or odd.

BRIEF DESCRIPTION OF THE DRAWINGS

The invention and its aspects will become more readily apparent from the following detailed description of preferred embodiments thereof, illustrated by way of example in the accompanying drawings, in which like reference numerals designate like or functionally equivalent parts, and in which.

DESCRIPTION OF PREFERRED EMBODIMENTS

Figure 1:
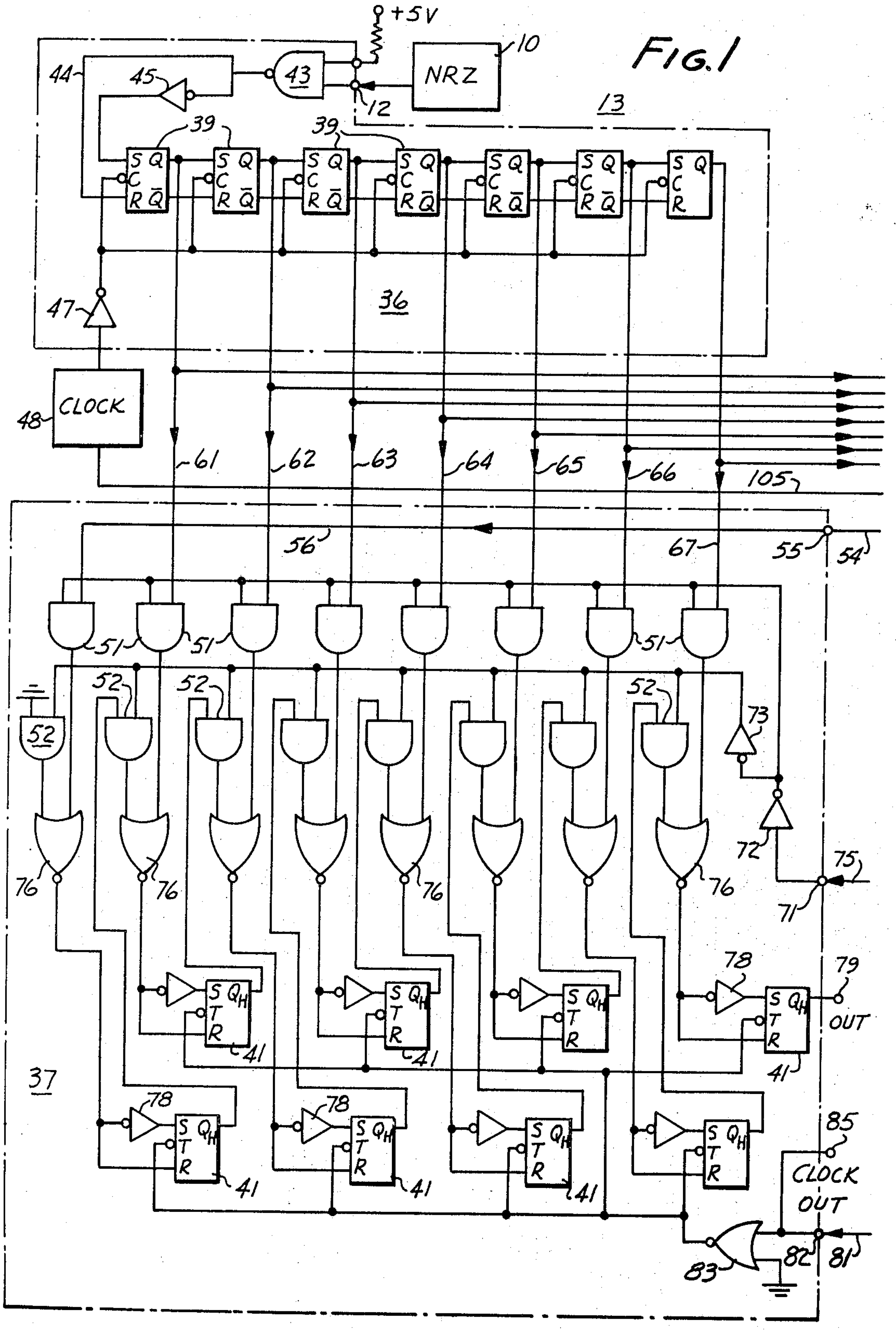
FIGS. 1, 2 and 3 are logic diagrams of a binary transition enhancing system in accordance with a preferred embodiment of the subject invention.
Figure 2:
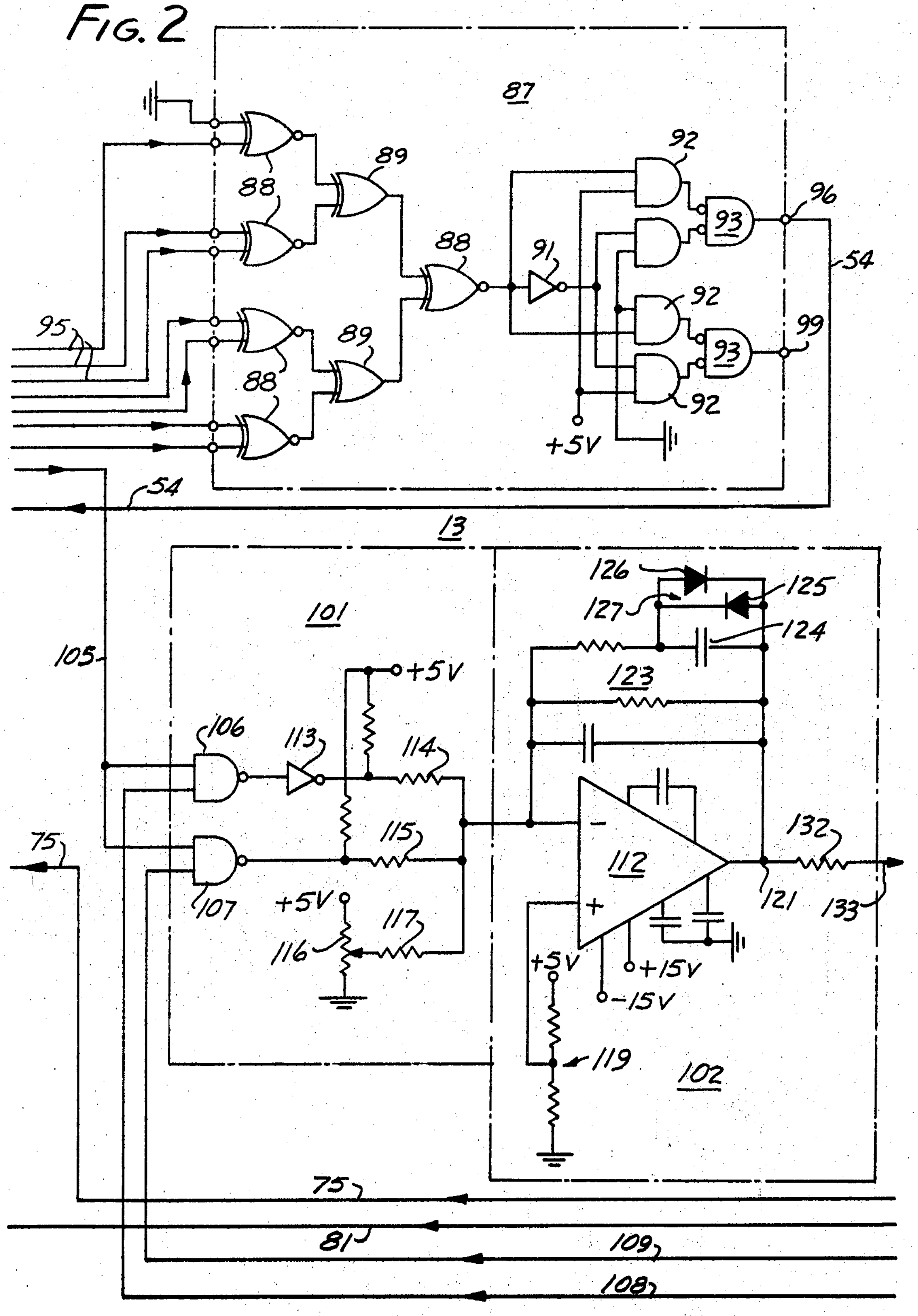
Figure 3:
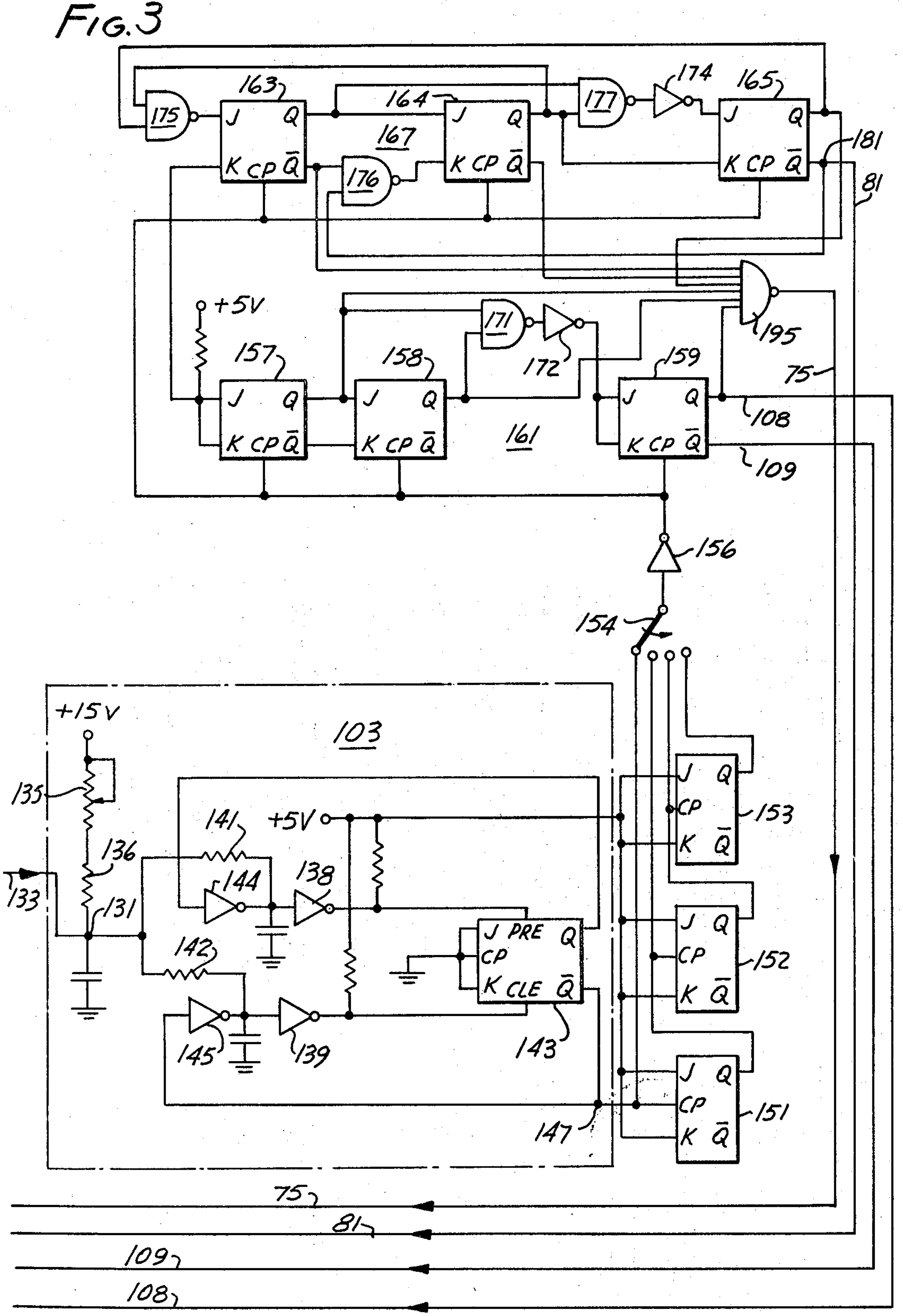

The preferred embodiment shown in FIGS. 1 to 3 has been designed for the enhancement of NRZ codes. This "non-return to zero code" is well known in the art, as may, for instance, be seen from TELEMETRY STANDARDS published by the Range Commanders Council, White Sands Missile Range, New Mexico 88002, Document 106-71, Revised January 1971, FIG. 4. The chief advantage of this code is that its wave form does not return to zero between digits of the same kind. This results in reduced bandwidth of the system and facilitation of equipment. On the other hand, prolonged non-return to zero renders the code non-self-clocking and, in many cases, not reliably recordable and reproducible.

Those skilled in the art will recognize that the latter drawbacks are not unique to NRZ codes. Accordingly, the utility of the subject invention is not confined to NRZ codes, but extends to other codes in which an enhancement of binary transitions is necessary or desirable.

According to FIG. 1, a conventional source 10 of NRZ coded data is connected to an input 12 of the transition enhancing system 13.

Figure 4:
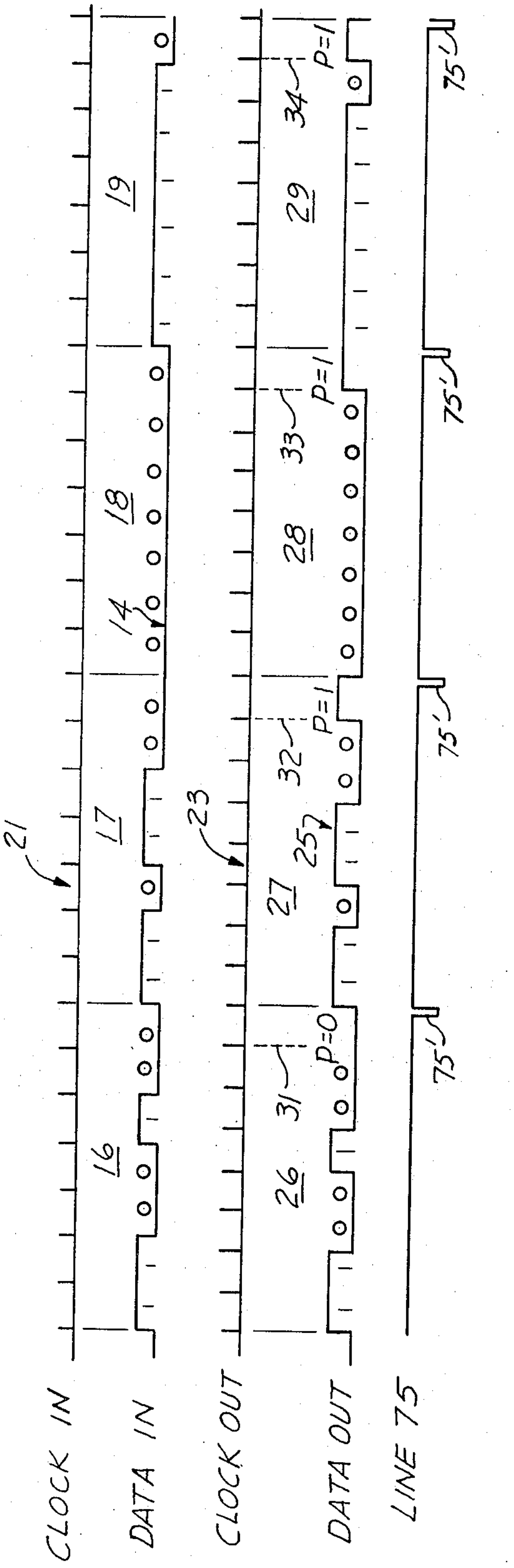
FIG. 4 is a representation of wave forms illustrating the operation of the system of FIGS. 1 to 3.
Figure 5:
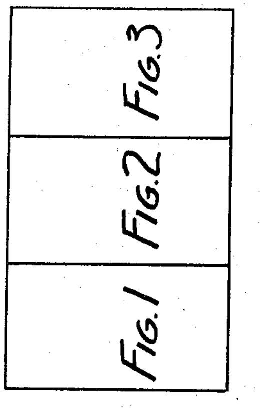
FIG. 5 is a diagram showing how the sheets containing FIGS. 1 to 3 should be positioned for a showing of the illustrated system.

The NRZ data received at the input 12 of the system 13 is represented by the wave form 14 in FIG. 4. As there seen, the data consists of binary ones and binary zeros. At one point, nine zeros coincide. At a subsequent point, six ones appear in succession. This renders the particular data unsuitable for recording and also negates any self-clocking characteristic thereof. An object of the present invention is to enhance the binary transitions so as to overcome the latter disadvantages.

As also seen in FIG. 4, the particular data appears in the form of a string of binary words 16, 17, 18, and 19. Each word has the same number of $n$ bits; namely seven bits in the illustrated example.

As shown by the wave form 21 in FIG. 4, the stream of binary words 14 is accompanied by a series of clock pulses 21. More specifically, each word is accompanied by $n$ clock pulses; namely seven clock pulses in the illustrated example.

In accordance with the subject invention the system 13 provides a second series of clock pulses having $(n+1)$ clock pulses for each $n$ clock pulses of the first series. In the illustrated preferred embodiment, and as illustrated in FIG. 4 by the wave form 23, the system 13 provides eight clock pulses for each seven clock pulses of the series represented by the wave form 21.

Also in accordance with the subject invention, the system provides a second stream of binary words in which each binary word of the above mentioned first stream is accommodated within $n$ clock pulses of the $(n+1)$ clock pulses of the second clock pulse series. In accordance with a preferred illustrated embodiment, and as illustrated in FIG. 4, the system 13 provides a second stream 25 of binary words 26, 27, 28, and 29, in which each binary word 16, 17, 18, and 19 of the first stream 14 is accommodated within seven clock pulses of the eight clock pulses of the second clock pulse series 23. Dotted lines 31, 32, 33, and 34 in FIG. 4 indicate the end of each word by itself in the second stream 25 of binary words.

Further in accordance with the subject invention, the system 13 provides the second stream 25 of binary words with parity bits during clock pulses outside the $n$ clock pulses within which each binary word is accommodated in the second stream 25. These parity bits may be either a binary zero, indicated by P=0, or a binary one, indicated by P=1.

Methods and equipment for effecting these features, as well as further embodiments of the subject invention, will now be described with the aid of FIGS. 1 to 3.

As shown in FIG. 1, the system 13 includes a first shift register 36 for processing seven bits and a second shift register 37 for processing eight bits. In general terms, the shift register 36 is capable of processing n bits and the shift register 37 is capable of processing $(n+1)$ bits.

Accordingly, the shift register 36 has seven set-reset flip-flop elements 39 and the shift register 37 has eight set-reset flip-flop elements 41. The register 36 further has a NAND element 43 for receiving the NRZ data from the source 10 and through the system input 12. The output of the NAND element is connected to the R-input of the first flip-flop element 39 by way of a lead 44. Conversely, the output of the NAND element 43 is connected by an inverter 45 to the S-input of the first flip-flop element 39.

To operate the shift register 36, clock pulses are applied to the C-input of the flip-flop elements 39 by way of an inverter 47. These clock pulses are generated by a conventional clock 48 capable of providing the series of clock pulses 21 shown in FIG. 4 and comprising conventionally an oscillator or multivibrator unit.

The shift register 36 may be of a conventional type, such as the serial-in parallel-out shift register Type SN74164, made by Texas Instruments Incorporated, of Dallas, Texas, and described and shown, for instance, in Texas Instruments catalog CC-401, Section 9, pp. 122–25. Similarly, the shift register 37 may be of a conventional type, as the parallel-in serial-out shift register Type SN74166 made by Texas Instruments Incorporated and described and shown, for instance, in Texas Instruments catalog CC-401, Section 9, pp. 134–41.

As seen in FIG. 1, the shift register 37 has a series of AND elements 51 and a series of AND elements 52. As will be more fully disclosed hereafter, the first AND element 51 receives through a lead 54 extending over FIGS. 1 and 2, a terminal 55 and a lead 56 a binary one as a parity bit when the number of binary ones in the words 26, 27, 28, 29, et seq. is even. The remaining AND elements 51 receive data bits from the shift register 36 through leads 61, 62, 63, 64, 65, 66, and 67 in a parallel input fashion. An input terminal 71 and inverters 72 and 73 are provided to switch the register 37 for broadside transfer of data from the register 36 to the register 37 by way of the leads 61 to 67 upon the receipt of a signal 75' applied through a lead 75 extending from FIG. 3 by way of FIG. 2 to FIG. 1, and illustrated at the bottom of FIG. 4.

The shift register 37 further includes a number of NOR elements 76 which have inputs connected to outputs of corresponding AND elements 51 and 52. The output of each NOR element 76 is connected to the R-input of a corresponding set-reset flip-flop element 41 and, by way of an inverter 78, to the S-input of the corresponding flip-flop element 41. The output of each but the last flip-flop element 41 is connected to an input of the next AND element 52 in the series.

The output of the last flip-flop element 41 of the register 37 is connected to the output 79 of the system 13.

A lead 81 extending from FIG. 3 by way of FIG. 2 to FIG. 1 applies clock pulses of the type shown at 23 in FIG. 4 to an input 82 of the shift register 37. These received clock pulses are applied by way of a NOR element 83 to the toggle inputs of the flip-flop elements 41. In addition, the clock pulses received through the lead 81 are also applied to an output terminal 85 which is associated with the systems output terminal 79. In this manner, the newly converted data with parity bits is accompanied by its own proper clock pulses.

A parity generator 87 is provided as shown in FIG. 2 to generate the requisite parity bits. The parity generator 87 may be of a conventional type, such as the Odd/Even parity generator Type SN74,180 made by Texas Instruments Incorporated and described and shown, for instance, in Texas Instruments catalog CC-401, Section 9, pp. 309–14. This parity generator has a number of Exclusive NOR elements 88, two Exclusive OR elements 89, an inverter 91, a number of AND elements 92 and two NOR elements 93.

Leads 95 extending from FIG. 1 to FIG. 2 individually connect the output leads 61 to 67 of the shift register 36 to inputs of the parity generator 87. This parity generator provides a binary one at an output 96 every time that the number of binary ones in a word in the register 36 is even. Every such binary one is applied as a parity bit by way of the lead 54 to the first AND element 51 in the register 37. In this manner, the parity bit in the form of a binary one is added to the word and thus appears at the end of the particular word when the same is shifted out through the output 79 when the shift register 37 is clocked by way of the NOR element 83.

Conversely, when the number of binary ones in a word shifted out of the register 36 is odd, then a binary one appears at an output 99 of the parity generator 87. In that case, the parity bit in the particular word is desired to be a binary zero. Accordingly, the parity generator output 99 is left open, so that a binary zero is provided by the AND element 91 at the end of each word which has an odd number of binary ones. By way of example, this is the case in the word 26 shown in the wave form 25 of FIG. 4.

The generation of the second series of clock pulses 23 for operation of the second shift register 37 will now be described with the aid of FIGS. 2 and 3. In general, the second series of clock pulses is providing by generating with the aid of the first series of clock pulses 21 a signal having a frequency equal to $b(n+1)$ times the clock pulse rate in the first series, and by generating with the aid of that signal a series of clock pulses having a rate equal to $1/bn$ times the frequency just defined. The symbol b stands for a positive number. In the illustrated preferred embodiment, this positive number is equal to one. Accordingly, the second series of clock pulses is in the illustrated preferred embodiment provided by generating with the aid of the first series 21 of clock pulses a signal having a frequency equal to eight times the clock pulse rate in the first series 21, and by generating with the aid of that signal a series of clock pulses 23 having a rate equal to one-seventh times the latter frequency.

The latter frequency of eight times the clock pulse rate in the series 21 is in the illustrated preferred embodiment generated with the aid of a phase detector 101, amplifier stage 102, and voltage controlled oscillator 103 shown in FIGS. 2 and 3, respectively.

The phase detector 101 has NAND elements 106 and 107 which receive the clock pulse series 21 by way of a lead 105 extending from the clock 48 of FIG. 1 to the phase detector 101 of FIG. 2.

A sophistication in the illustrated preferred embodiment will be disclosed at the present time. According to this refinement, the clock pulse series 23 is provided by generating with the aid of the first series of clock pulses 21 a first signal having a frequency equal to $b(n+1)$ times the clock pulse rate in the first series 21, generating with the aid of that first signal a second signal having a pulse rate equal to $1/[b(n+1)]$ times the frequency of the latter first signal, employing the second signal just mentioned in the generation of the mentioned first signal, generating with the aid of the mentioned first signal a third signal having a pulse rate equal to $1/bn$ times the frequency of the mentioned first signal, and employing the third signal as the second series of clock pulses 23, with $b$ being again a positive number.

In the illustrated preferred embodiment, the latter second signal having a pulse rate equal to $1/[b(n+1)]$ times the frequency of the mentioned first signal has a pulse rate equal to one-eighth the frequency of the first signal. This latter second signal is applied by a pair of leads 108 and 109 to the phase detector 101. The leads 108 and 109 extend over the FIGS. 2 and 3 and are connected to inputs of the NAND elements 106 and 107.

The output of the NAND element 106 is applied to the inverting input of an operational amplifier 112 by way of an inverter 113 and a resistor 114. The output of the NAND element 107 is applied by way of a resistor 115 to the inverting input of the operational amplifier 112. A variable resistor 116 is connected by way of a resistor 117 to the inverting input of the amplifier 112 and provides for a zero adjustment of the phase-lock loop formed by way of the leads 108 and 109.

The signal thus applied to the inverting input of the amplifier 112 is representative of the phase difference between the clock pulses received from the clock 48 and the feedback pulses received through the leads 108 and 109.

A voltage divider 119 applies to the non-inverting input of the operational amplifier 112 a voltage of +2.3 volts. Similarly, the voltage applied to the inverting input of the amplifier 112 is also +2.3 volts when the phase detector 101 senses zero difference between the rate of the clock pulses received from the clock 48 and the frequency of the signal received by way of the leads 108 and 109.

Moreover, the voltage appearing at the output 121 of the operational amplifier 112 is also +2.3 volts when the voltages at the inverting and non-inverting inputs of the amplifier 112 are equal to +2.3 volts. The operational amplifier 112 may be of a conventional type, such as the well-known Type 715, described and shown, for instance, in the Fairchild Semiconductor Linear Integrated Circuits Data Catalog, November 1971, pp. 40 to 46 under the designation μA715.

The operational amplifier 112 has a feedback circuit 123 including a low-pass filter. A capacitor 124 in the feedback circuit has a pair of oppositely poled diodes 125 and 126 connected in parallel thereto. The diodes 125 and 126 form an amplitude limiter 127 which prevents spurious locking-in by the voltage controlled oscillator 103 by confining its operating range.

The output of the operational amplifier is connected to the input 131 of the voltage controlled oscillator 103 by way of a resistor 132 and a lead 133. The lead 133 extends from FIG. 2 to FIG. 3.

A variable voltage for adjustment of the frequency provided by the voltage controlled oscillator 103 is provided by a variable resistor 135 connected by way of a fixed resistor 136 to the voltage controlled oscillator input 131. The voltage controlled oscillator 103 includes inverters 138 and 139 connected to the input 131 by way of resistors 141 and 142. The outputs of the inverters 138 and 139 are, respectively, connected to the presetting input and the clearing input of a J-K flip-flop element 143. The flip-flop element 143 has its J, K and CP (clock pulse) inputs grounded. The Q and $\bar{Q}$ outputs of the flip-flop element 143 are connected to the inverters 138 and 139 by way of inverters 144 and 145, respectively.

In general terms, the voltage controlled oscillator 103 generates at its output 147 a signal having a frequency equal to $b(n+1)$ times the clock pulse rate in the first clock pulse series 21. In the illustrated preferred embodiment, the voltage controlled oscillator 103 generates at its output 147 a signal having a frequency equal to eight times the rate of the clock pulses in the first series 21. To permit operation with different clock pulse rates, three J-K flip-flop elements 151, 152, and 153 and a selector switch 154 are provided for a clock pulse rate division of two, four and eight, respectively.

The output of the voltage controlled oscillator 103 or, if used, the output of one of the flip-flop elements 151, 152 and 153 is applied by way of an inverter 156 as clock pulses to three J-K flip-flop elements 157, 158, and 159 of an eight counter 161, and to three J-K flip-flop elements 163, 164, and 165 of a seven counter 167.

The eight counter 161 divides the frequency received through the inverter 156 by eight. For this purpose, the counter 161 includes not only the flip-flop elements 157, 158, and 159 but also a NAND element 171 and an inverter 172, connected as shown in FIG. 3.

The seven counter 167 divides the frequency received through the inverter 156 by seven and, for this purpose, includes not only the flip-flop elements 163, 164 and 165, but also an inverter 174 and NAND elements 175, 176 and 177 connected as shown in FIG. 3.

The output signal of the eight counter 161 is applied by way of the leads 108 and 109 to the phase detector 101 shown in FIG. 2. Since the voltage controlled oscillator 103 in effect multiplies the clock rate of the series 21 by eight, and since the eight counter 161 divides that multiplied frequency by eight, it follows that the frequency of the signal applied by way of the leads 108 and 109 to the phase detector 101 is normally equal to the pulse rate of the clock pulse series 21 derived from the clock 48. The phase detector 101, amplifier stage 102, voltage controlled oscillator 103, eight counter 161, and leads 108 and 109 form a phase-lock loop which slaves the output frequency of the voltage controlled oscillator 103 to the input pulse rate of the phase detector 101.

The signal appearing at the output 181 of the seven counter 167 has a rate equal to $1/bn$ times the output frequency of the voltage controlled oscillator 103. This may also be expressed by saying that the pulse rate of the output signal of the counter 167 is equal to $(n+1)/n$ times the pulse rate of the clock pulse series 21 provided by the clock 48 in FIG. 1. In terms of the illustrated preferred embodiment, the output signal of the counter 167 has a pulse rate equal to eight-sevenths of the pulse rate of the clock pulse series 21.

The latter output signal of the counter 167 is applied by the lead 81 to the clock pulse input 82 of the shift register 37 in FIG. 1. In this manner the previously described wave form 25 shown in FIG. 4 and the second series of clock pulses 23 are realized.

As may be seen in FIG. 4, each word in the wave form 25 which has an even number of binary ones is accompanied by a parity bit in the form of a binary one (P=1). Since a lack of binary ones is considered as an instance of an even number of binary ones, a parity bit in the form of a binary one is also added if a word consists entirely of binary zeros. This has been illustrated in FIG. 4 with the aid of the words 18 and 28.

As is easily seen from a comparison of the wave forms 14 and 25 in FIG. 4, the subject invention and its preferred embodiments provide pulse code modulated data with additional binary transitions for an enhanced recordability thereof and for the provision of self-clocking data.

After recording and reproduction, or after processing in another desired manner, the parity bits at the end of the words are easily detected since they all occur in the eighth bit of a word and the data are then utilized for any purpose for which the NRZ data provided by the source 10 were intended.

In practical embodiments, and for increased speed and reliability of operation, Schottky-Components are preferably used for the components 106, 107, 113, 138, 139, 144, 145, 151, 152, 153, 156, 157, 158, 159, 171, 172, 163, 164, 165, 177 and 174.

The illustrated system 13 includes also means connected to the counters 161 and 167 for determining a first predetermined count in the seven counter 167 and a second predetermined count in the eight counter 161, and for enabling a broadside transfer of binary bits from the register 36 to the register 37 in response to each determination of the latter first and second counts. According to FIG. 3, this is implemented by connecting inputs of a NAND element 195 to elements of the counters 161 and 167 in the illustrated manner so that a signal 75' is applied by way of the lead 75 to the counter 37 when a count of four of the seven counter 167 coincides with a count of seven of the eight counter 161. In that case, the input 82 of the shift register 37 goes to zero so that a broadside transfer of information from the register 36 to the register 37 occurs under control of the clock pulses 82. This loads the register 37 with the bits of a word and also with a parity bit from the generator 87. These bits are then shifted out through the systems output 79 as disclosed above.

Figure 6:
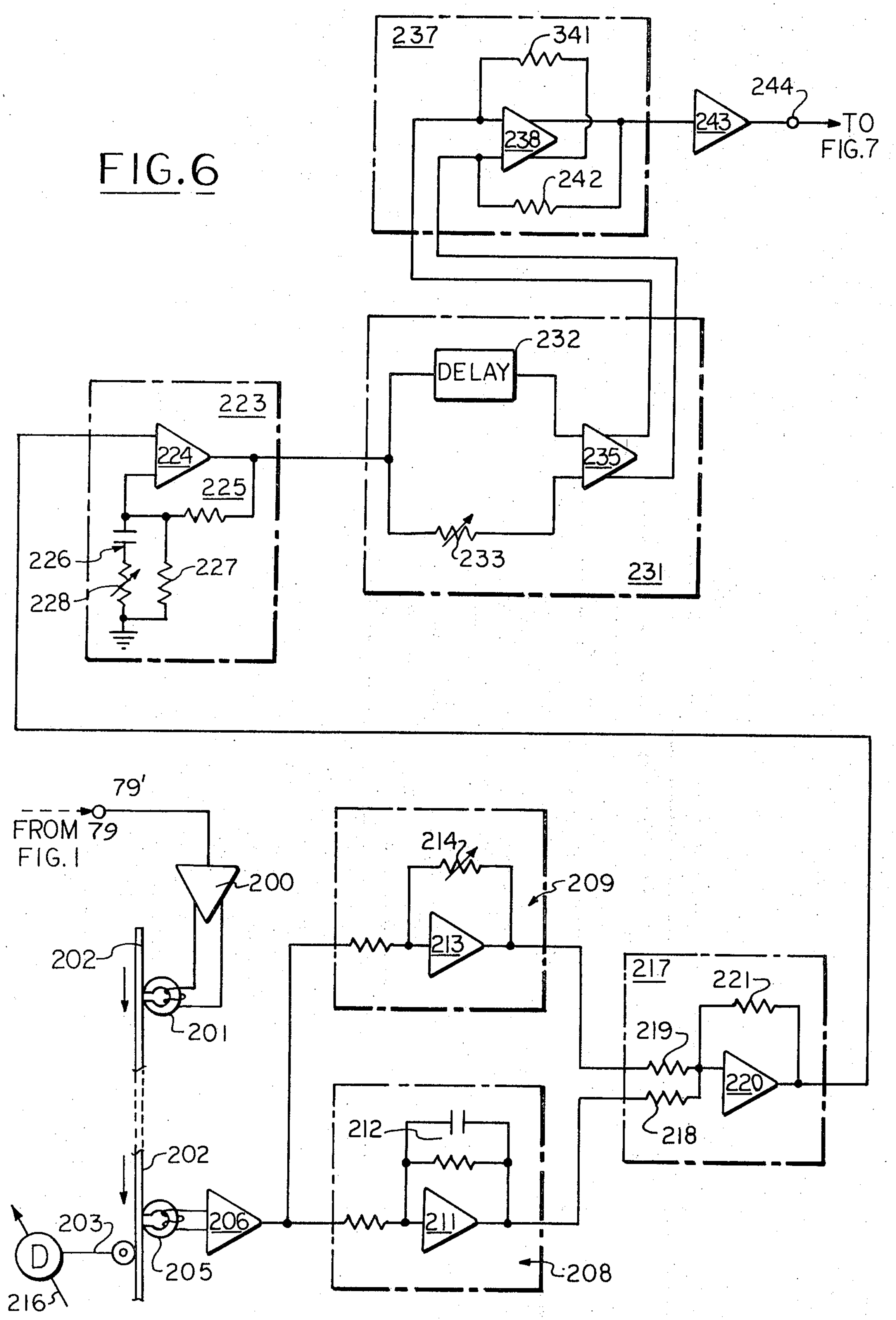
FIG. 6 is a block diagram of a system for recovering transmitted or played-back binary data.

As shown in FIG. 6, the enhanced NRZ data provided at the enhancer systems output 79 shown in FIG. 1 may be applied to an input terminal 79' of a recording amplifier 200 for a recording of these data, by means of a magnetic recording head 201, on a magnetic recording tape 202 which is advanced by a tape drive 203 relative to the recording head 201. It will, of course, be understood that magnetic recording of the enhanced data is shown by way of example and not by way of limitation. If desired, the enhanced data may be recorded on photographic film with the aid of modulated light-emitting recording devices, or on any other desired recording medium. It is also within the contemplation of the subject invention that the enhanced data may be transmitted over cables or radio links.

In considering FIG. 6, it will be noted that the clock pulses provided at the clock output 85 shown in FIG. 1 are not recorded in the preferred embodiment shown in FIG. 6. This, of course, saves an extra recording channel which would otherwise have to be provided for recording the clock pulses on the tape 202. This significant saving is possible by the self-clocking character of the enhanced data generated according to the subject invention.

If a playback of the recorded enhanced data is desired, the recording type 202 is advanced by the tape drive 203 past a magnetic playback head 205. The played-back enhanced data is amplified by a playback amplifier 206.

The played-back signal at the output of the reproduced preamplifier 206 suffers from differentiation effect, high-frequency losses, direct-current baseline shift, and phase distortion. Correction for low-frequency differentiation may be effected by integrating a portion of the played-back signal and by adding such integrated portion to an amplified version of the played-back signal. To this effect, the preamplified played-back signal is applied to an integrating stage 208 for low-frequency equalization, and to a mid-frequency gain stage 209 for mid-band gain adjustment.

The integrating stage 208 comprises an operational amplifier 211 and an RC network 212 connected in a feedback path of the amplifier 211. The mid-frequency gain stage 209 comprises an amplifier 213 having an adjustable feedback path 214. In practice, the adjustable feedback path 214 may be switched together with a switching of the speed of the tape 202 if the tape drive 203 has a speed switching feature as indicated by the arrow 216 in FIG. 6.

A summing stage 217 comprising summing resistors 218 and 219 and an operational amplifier 220 with feedback resistor 221 is employed to combine the outputs of the stages 208 and 209.

A high-frequency equalization stage 223 is provided after the summing stage 217. The high-frequency equalization stage 223 comprises an operational amplifier 224 having a feedback path 225 with a series-connected RC network 226 having a resistor 227 connected in parallel thereto and being grounded at one side. The RC network 226 has an adjustable resistance 228 that may be varied in conjunction with a switching of the speed of advance of the tape 202.

The gain and phase equalized signal is applied to a differencing stage 231. This differencing stage has a time delay network 232 for delaying the equalized signal by one-half bit time of the binary data contained therein. A gain trim resistor 233 is connected in parallel to the delay network 232. The variable resistor 233 does not delay the equalized signal, but provides for a gain setting which is typically effected at the factory.

The differencing stage 231 also includes a differential amplifier 235 for differentially amplifying the delayed and non-delayed signals received from the delay network 232 and from the gain trim resistor 233, respectively.

The differencing stage 231 operates as a detector of the played-back signal, the basic nature and operation of which are known from the book by Bernard B. Byer, entitled "Digital Magnetic Tape Recording Principles and Computer Applications" (Hayden Book Company) pp. 116 and 117.

The differential amplifier 235 will have a positive or a negative output signal, according to whether the played-back signal is increasing or decreasing.

The output signal of the differential amplifier 235 is applied to a differential comparitor 237 which is connected to the differencing stage 231. The differential comparitor 237 comprises an operational amplifier 238 provided with positive feedback paths 241 and 242 for amplifying and clipping the detected played-back signal. The clipped signal is further amplified by an output amplifier 243, and the finally amplified played-back signal appears at an output terminal 244.

Figure 15:
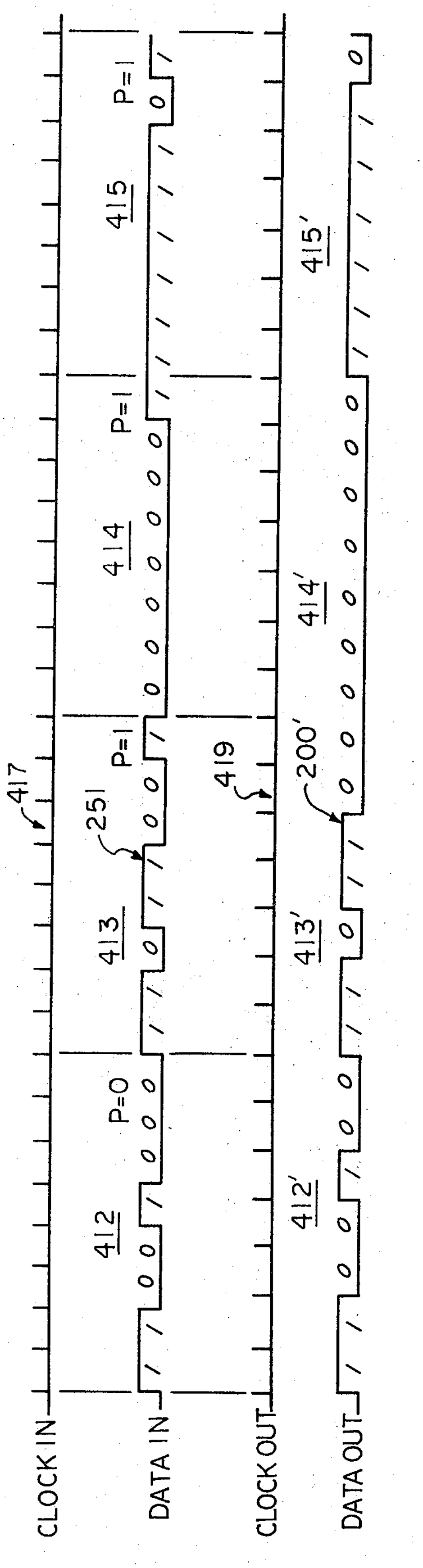
FIG. 15 is a representation of waveforms illustrating the operation of the system of FIGS. 9 to 12.
Figure 16:
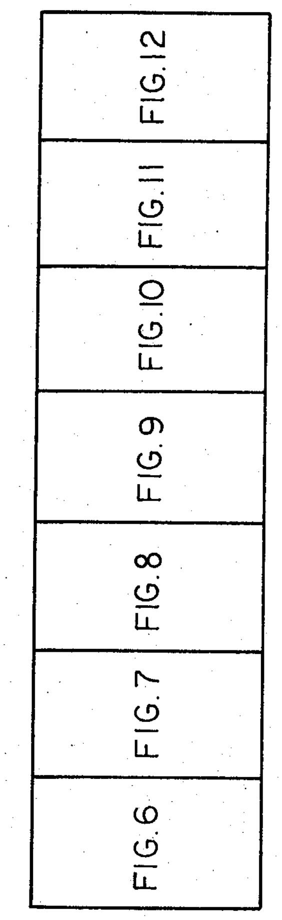
FIG. 16 is a diagram showing how the sheets containing FIGS. 6 to 12 should be positioned for a showing of the illustrated methods and apparatus.

The signal at terminal 244 includes, of course, the parity bits which have been added to the data prior to recording, as mentioned above, and generally follows the waveform 251 illustrated in FIG. 15. For further information on the equipment shown in FIG. 6, reference may be had to the above mentioned Gish patent application or patent.

Figure 7:
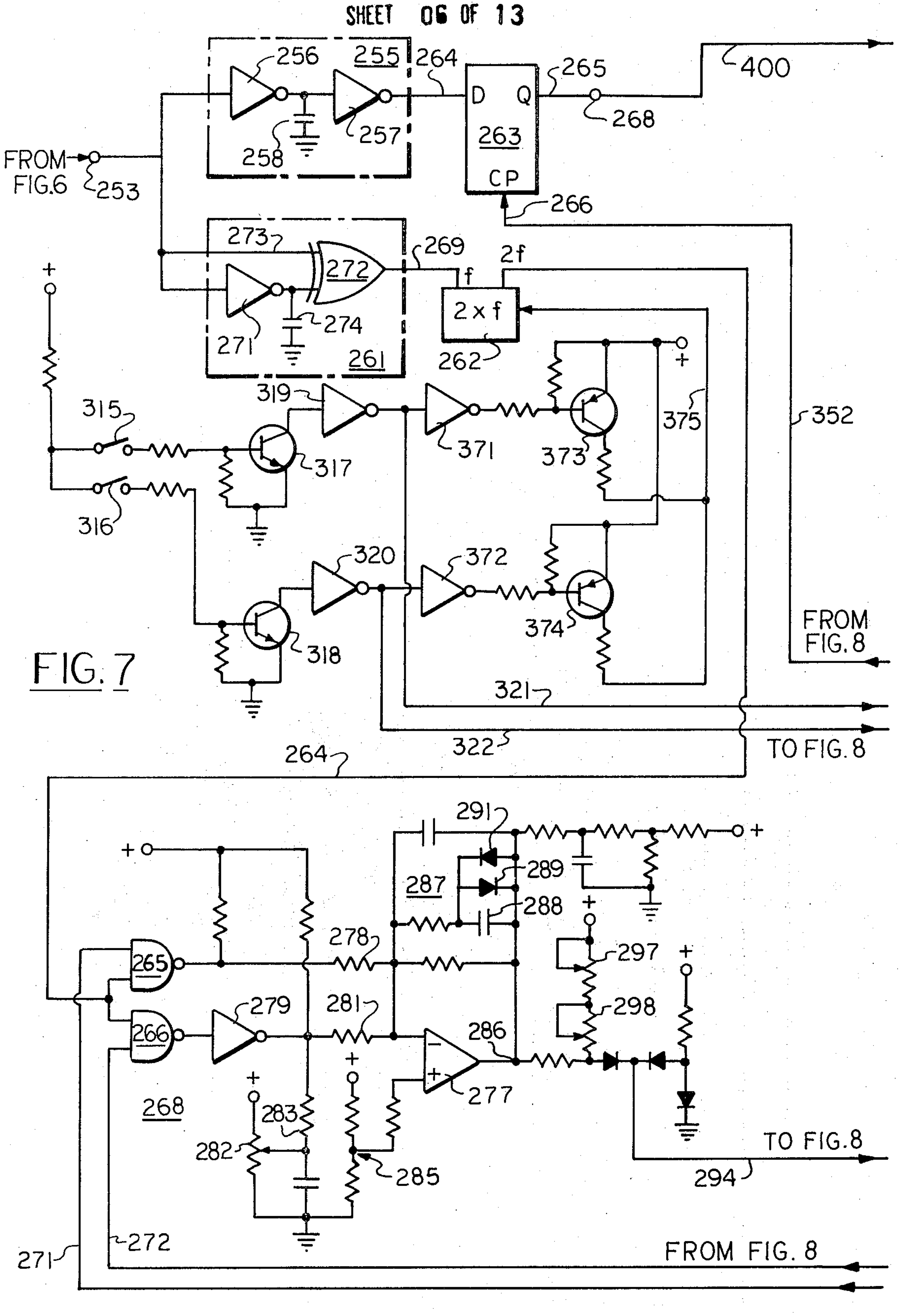
FIGS. 7 and 8 are logic diagrams of a system for synchronizing binary data recovered by the system of FIG. 6.
Figure 8:
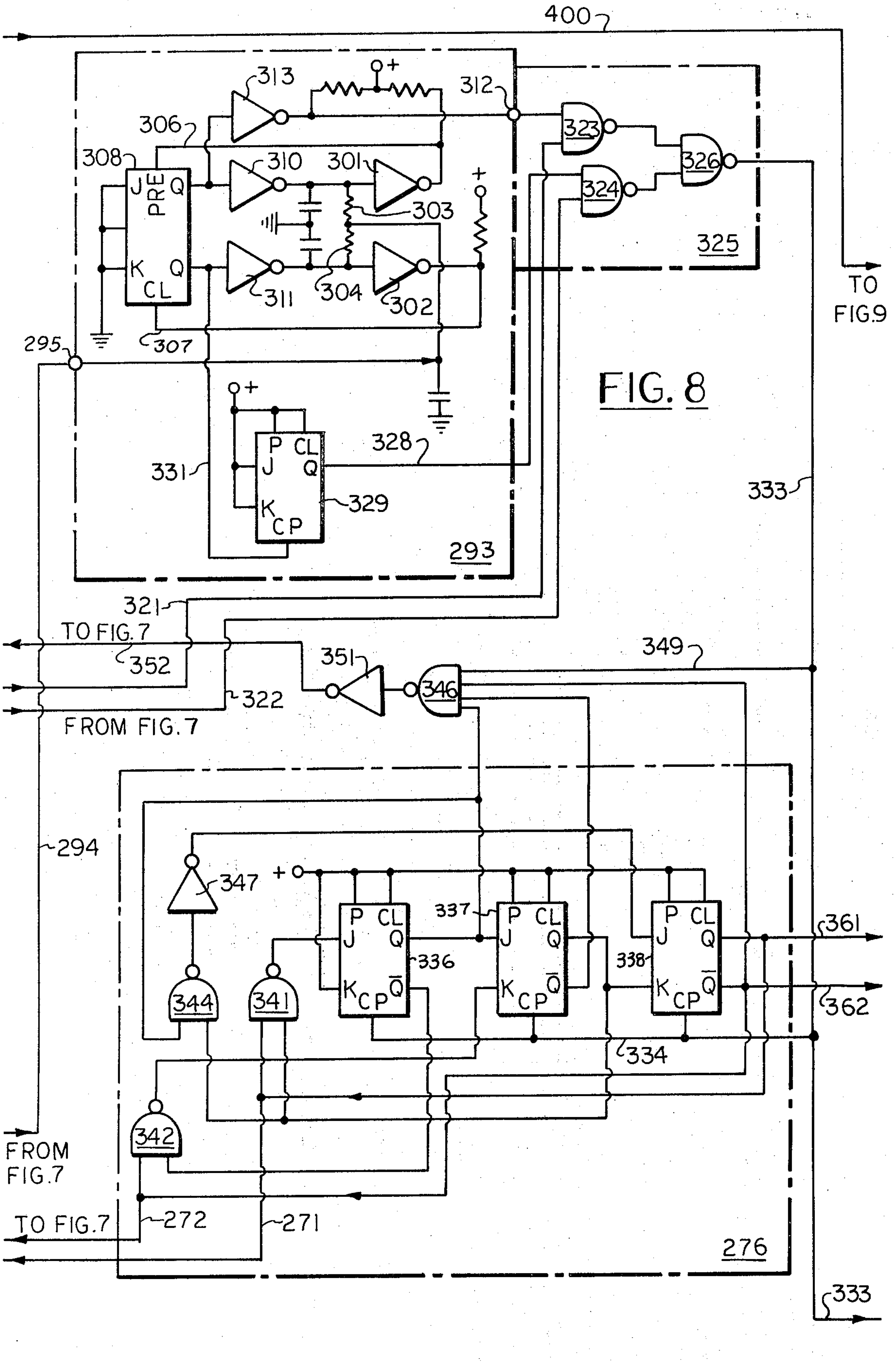

The detected and amplified played-back data occurring at the terminal 244 in FIG. 6 is applied to the input terminal 253 in FIG. 7. FIGS. 7 and 8 jointly disclose a bit synchronizer the nature and operation of which will presently be described. Briefly, it is an object of this bit synchronizer to regenerate the bits received from the terminal 244 and to generate clock pulses synchronized with the regenerated bits. It will be recalled at this juncture that the clock pulses are not recorded on the magnetic tape 202 in the illustrated preferred embodiment of the subject invention.

As shown in FIG. 7, the bit synchronizer has a delay device 255 connected to the input terminal 253. The delay device 255 comprises a pair of inverters 256 and 257 and a delay capacitor 258 connected to a junction point between the inverters 256 and 257. The delay device 255 imposes a delay on the received binary bits in order to compensate for a delay imposed by the edge detector 261 and frequency doubler 262 presently to be described. The binary data bits delayed by the device 255 are applied to a conventional delay flip-flop 263 which has a data input 264, a data output 265 and a clock pulse input 266. The object of the delay flip-flop 263 is to present the regenerated data bits at a bit synchronizer output 268 for a subsequent removal of the parity bits included in these data.

The edge detector 261 is connected to the input terminal 253 to provide at an output 269 a short pulse or spike in response to every signal level change in the bits received at 253. The edge detector 261 thus operates as a means for detecting signal level edges in the received bits.

The edge detector 261 has a converter 271 connected to the input terminal 253 and an exclusive OR element 272 having a first input connected via a lead 273 to the input terminal 253 and having a second input connected to the output of the inverter 271. A capacitor is connected to a junction between the inverter 271 and the exclusive OR element 272.

The lead 273 may be viewed as first means for providing an input of the exclusive OR element 272 with changing signal levels in response to received bit edges. The circuit branch including the inverter 271 and the capacitor 274 may be viewed as a second means for providing second changing signal levels in response to received bit edges. This second means includes a third means in the form of the capacitor 274 for delaying the mentioned second changing signal levels relative to the above mentioned first changing signal levels. The exclusive OR element 272 may then be viewed as a fourth means connected to the first and second means for providing edge indicative pulses in delay intervals between the first and second changing signal levels.

More specifically, if the signal level of the data received at input terminal 253 is high, then the output of the edge detector 261 at 269 is also high. If the level of the data received at input terminal 253 drops thereafter to a low, then the input of the exclusive OR element 272 connected to the lead 273 immediately goes to a low as no delay is imposed by the lead 273. The input of the exclusive OR element 272 connected to the inverter 271, however, cannot immediately change its level due to the delay imposed by the capacitor 274. Accordingly, a short delay will occur before the input of the OR element 272 connected to the inverter 271 can rise to a high level. In consequence, similar signal level conditions will exist at the inputs of the exclusive OR element 272 during the brief duration of the delay imposed by the capacitor 274. The output of the exclusive OR element 272 will thus be low during that brief delay.

When the capacitor 274 has been charged, there will be dissimilar signal levels at the inputs of the exclusive OR element 272, resulting in the resumption of a high signal level at the output 269 of the edge detector 261. If the data received at the input terminal 253 thereafter resumes a high voltage level, the input of the exclusive OR element 272 connected to the lead 273 will immediately receive such high voltage level. Simultaneously, the charged capacitor 274 a decrease of the voltage level at the input terminal of the exclusive OR element 272 connected to the inverter 271. In consequence, the output of the edge detector 261 will again go to a low value for the duration of the delay imposed by the capacitor 274. After that capacitor has been sufficiently discharged by the inverter 271, there will again be dissimilar signal levels at the inputs of the exclusive OR element 272, resulting in a resumption of the high signal level of the output of the edge detector 261 at the lead 269.

Figures 14A, 14B, 14C, 14D, 14E, 14F, 14G, 14H, 14I:
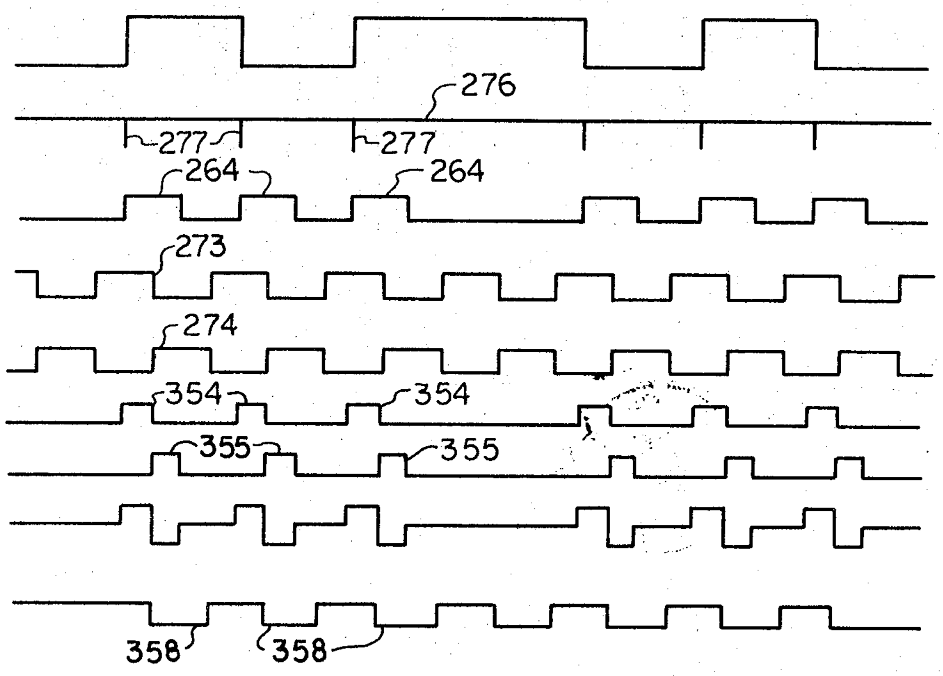
FIGS. 14*a* to 14*i* are waveform representations illustrating the operation of the system of FIGS. 7 and 8.

It will thus be recognized that the detected edges are manifested by a string of negative pulses relative to a high signal level. This is illustrated in FIG. 14, where FIG. 14*a* shows an example of received data bits occurring at the input terminal 253, while FIG. 14*b* shows the output signal of the edge detector 261 comprising the above mentioned high voltage level 276 and the edge indicative negative-going pulses 277. The frequency of the signals provided at the edge detector output 269 is doubled by a one-shot multivibrator 262.

As shown in FIG. 14*c*, the multivibrator 262 provides a constant time pulse 264 in response to each edge detection signal 277 provided by the edge detector 261. A lead 264 applies these constant time pulses 264 to two NAND elements 265 of a phase detector 268. A pair of leads 271 and 272 apply to the NAND elements 265 and 266, respectively, of the phase detector 268 reference signals of the type shown at 273 in FIG. 14*d* and 274 in FIG. 14*e*. These reference signals for the phase lock loop of which the phase detector 268 is a part, are provided by the digital counter 276 shown in FIG. 8 and which will be more fully described below.

The output of the NAND element 265 is connected to the inverting input of an operational amplifier 277 by way of a resistor 278. The output of the NAND element 266 is connected to the same inverting input by way of an inverter 279 and a resistor 281. A variable resistor 282 is connected by way of a resistor 283 to the inverting input of the amplifier 277 and provides for a zero adjustment of the phase-lock loop formed by way of the leads 271 and 272.

The signal thus applied to the inverting input of the amplifier 277 is representative of the phase difference between the constant time pulses received from the multivibrator 262 and the feedback or reference signal pulses received through the leads 271 and 272.

A voltage divider 285 applies to the non-inverting input of the operational amplifier 227 a voltage of +2.3 volts. Similarly, the voltage applied to the inverting input of the amplifier 277 is also +2.3 volts when the phase detector 268 senses zero difference between the rate of the pulses received from the multivibrator 262 and the frequency of the signal received by way of the leads 271 and 272.

Moreover, the voltage appearing at the output 286 of the operational amplifier 277 is also +2.3 volts when the voltages at the inverting and non-inverting inputs of the amplifier 277 are equal to +2.3 volts. The operational amplifier 277 may be of a conventional type, such as the well-known Type 715.

The operational amplifier 277 has a feedback circuit 287 including a low-pass filter. A capacitor 288 in the feedback circuit has a pair of oppositely poled diodes 289 and 291 connected in parallel thereto. These diodes form an amplitude limiter which prevents spurious locking-in by the voltage controlled oscillator 293 shown in FIG. 8, by confining its operating range.

A lead 294 applies the output signal of the operational amplifier 277 to the input 295 of the voltage controlled oscillator 293. Variable resistors 297 and 298 shown in FIG. 7 provide coarse and fine adjustments of the frequencies generated by the voltage controlled oscillator 293.

The voltage controlled oscillator 293 includes inverters 301 and 302 connected to the input 295 by resistors 303 and 304. The outputs of the inverters 301 and 302 are, respectively, connected by leads 306 and 307 to the presetting input and to the clearing input of a J-K flip-flop element 308. The flip-flop element 308 has its J, K and clock pulse inputs grounded, The Q and $\bar{Q}$ outputs of the flip-flop element 308 are connected to the inverters 301 and 302 by way of inverters 310 and 311, respectively.

The Q output of the flip-flop element 308 is also connected to the output of the voltage controlled oscillator 312 by way of an inverter 313. In general terms, the voltage controlled oscillator 293 generates at its output 312 a signal having a frequency equal to $bn$ times the bit rate of the data received at the input 253 of the apparatus shown in FIG. 7; wherein $n$ is the number of word bits in each binary word received at the input 253, while $b$ is a positive number. For instance, the voltage controlled oscillator 293 generates at its output 312 a signal having a frequency of 28 MHz if the bit rate of the data received at the input 253 in FIG. 7 is $4 \cdot 10^6$ bits per second, if there are seven word bits per binary word received at 253, and if the factor $b$ is equal to one.

To permit operation of the recording and playback equipment (see FIG. 6) at selected speeds, speed selector switches may be employed. By way of example, two of these switches are shown at 315 and 316 in FIG. 7. Actuation of the switches 315 and 316 actuates switching transistors 317 and 318 which have outputs connected to inverters 319 and 320, respectively.

A pair of leads 321 and 322 connect the outputs of the inverters 319 and 320 in FIG. 7 to inputs of NAND elements 323 and 324 of a binary divider chain 325 which further includes a NAND element 326 having inputs connected to the outputs of the NAND elements 323 and 324.

The NAND element 323 of the divider chain 325 has an input connected to the output 312 of the voltage controlled oscillator 293. The NAND element 324 has an input connected by a lead 328 to the Q output of a J-K flip-flop element 329. The flip-flop element 329 is clocked by way of a lead 331 from the $\bar{Q}$ output of the J-K flip-flop element 308 of the voltage controlled oscillator 293, in order to control operation of the divider chain 325. Depending on the actuation of the selector switches 315 and 316 shown in FIG. 7, the divider chain 325 divides the frequency of the output signal of the voltage controlled oscillator by a divisor corresponding to the then prevailing playback speed.

The output of the NAND element 326 of the divider chain 325 is connected to a lead 333 which then carries clock pulses that are synchronized with the regenerated bits occurring at the output 268 of the bit synchronizer (see FIG. 7).

As seen in FIG. 8, a lead 334 is connected to the lead 328 in order to apply the latter clock pulses to the clock pulse inputs of three J-K flip-flop elements 336, 337, and 338 of the binary counter 276. The objective of the binary counter 276 is to divide the clock by the same factor by which it was multiplied by the voltage controlled oscillator 293. For instance, if we assume the above mentioned factor $b$ to be equal to one, and if we further assume the above mentioned factor $n$ to be equal to seven, then the digital counter 276 may be a seven counter.

The Q and $\bar{Q}$ outputs of the flip-flop element 338 of the digital counter 276 are not only connected to the leads 271 and 272 as mentioned above, but also to inputs of NAND elements 341 and 342 in the counter 276. The NAND element 341 and a further NAND element 344 receive the Q output of the flip-flop element 337. The output of the NAND element 341 is connected to the J input of the flip-flop element 336.

The $\bar{Q}$ output of the flip-flop element 336 is connected to a second input of the NAND element 342. The output of the NAND element 342 is connected to the K input of the flip-flop element 337. The Q output of the flip-flop element 336 is connected to the J input of the flip-flop element 337, to a further input of the NAND element 344, and to an input of a further NAND element 346. The output of the NAND element 344 is connected by way of an inverter 347 to the J input of the flip-flop element 336.

The $\bar{Q}$ output of the flip-flop element 337 is connected to a further input of the NAND element 346. The $\bar{Q}$ output of the flip-flop element 338 is connected to yet another input of the NAND element 346. A lead 349 connects the clock pulse lead 333 to a fourth input of the NAND element 346.

The NAND element 346 responds to the generated clock pulses appearing at the lead 333 and to a predetermined counting state of the digital counter 276 in order to actuate the flip-flop element 263, shown in FIG. 7, by way of an inverter 351 and a lead 352. The pulses thus applied to the input 266 of the flip-flop element 263 only actuate these bit regenerating means during the occurrence of a center portion of each received bit. This is an important feature since the center portions of the received bits are typically better defined in voltage than the edge regions of the bits.

Reverting to the phase detector 268 shown in FIG. 7, the pulses occurring at the output of the NAND element 265 from an addition of the output of the multivibrator 262 and the Q output of the flip-flop element 283 of the digital counter 276 are shown in FIG. 14*f* at 354. Similarly, the pulses occurring at the output of the NAND element 266 from an addition of the output of the multivibrator 262 and the $\bar{Q}$ output of the flip-flop element 338 are shown in FIG. 14*g* at 355. Due to the presence of the inverter 279 in the phase detector 268, the outputs of the NAND elements 265 and 266 are algebraically added, with the output of the NAND element 266 being subtracted from the output of the NAND element 265. The result of this subtraction is applied to the inverting input of the operational amplifier 277, and is illustrated by the wave form shown in FIG. 14*h*.

As seen in the center region of FIG. 14*c*, the multivibrator 268 does not produce a further pulse if a bit of a given value follows a bit of like value. However, due to the electronic flywheel effect of the voltage controlled oscillator 293 shown in FIG. 8, a gating pulse for the flip-flop 263 shown in FIG. 7 is still provided for each received data bit. Accordingly, the FIG. 14*i* shows a gating pulse 358 for each received data bit. As mentioned above, each of these pulses occurs during the occurrence of a center portion of the received data bits in order to actuate the flip-flop element 263 through the lead 252 and input 266 to regenerate corresponding data bits at the bit synchronizer output 268.

As an important feature of the currently described embodiment of the subject invention, the bit synchronizer shown in FIGS. 7 and 8 operates not only as a bit synchronizer that provides regenerated data bits and corresponding clock pulses, but also as a frequency synthesizer that provides signals for a generation of further clock pulse rates and for an operation of equipment other than the bit synchronizer.

To this end, a pair of leads 361 and 362 connects the Q and $\bar{Q}$ outputs of the flip-flop element 338 of the digital counter 276 to parts of the parity bit removing equipment shown in FIGS. 9 to 12, as will be disclosed more fully below.

Considering the disclosure of the bit synchronizer shown in FIGS. 7 and 8, it will be recognized that the phase detector 268, the loop amplifier and filter 277 and 287, the voltage controlled oscillator 293, and the digital counter 276 are connected in a phase lock loop which provides clock pulses for operating the bit synchronizer shown in FIGS. 7 and 8 and for operating further the parity bit remover system shown in FIGS. 9 to 12.

To adjust the multivibrator 262 of the bit synchronizer to different tape speeds as selected by actuation of the switches 315 and 316, the outputs of the inverters 319 and 320 shown in FIG. 7 are connected to inputs of inverters 371 and 372, which have outputs connected to switching transistor circuits 373 and 374, respectively. A lead 375 applies the output signals of the switching circuits 373 and 374 to the multivibrator 262 as a bias which, in a conventional manner, changes the duration of the constant time pulses 264 (see FIG. 14*c*) so that the pulse width ideally corresponds to one-half the bit width at any selected speed of the tape 202.

An example of the wave form of the synchronized regenerated data occurring at the bit synchronizer output 268 (FIG. 7) is shown at 257 in FIG. 15. As seen from the wave form 10, the binary words with parity bits are in the form of a continuous stream of binary words. This raises the problem of identifying the words in the absence of indications as to the word beginning or word ending as well as the problem of indentifying the parity bits which are either binary "zero" bits or binary "one" bits and thus indistinguishable from the data bits.

In general, each of the words 412, 413, 414 and 415 of the stream 251 of binary words has *n* word and *p* parity bits. In the illustrated example, there are seven word or data bits and one parity bit for each word. If the number of binary "one" word or data bits in a word is odd, then the parity bit in that word is a binary "zero." On the other hand, if the number of binary "one" word or data bits in a word is even, then the parity bit in that word is a binary "one." In this manner, the number of binary "one" word and parity bits is odd in essentially each word. This maximizes an enhancement of binary transitions in the code.

The wave form 417 in FIG. 15 represents a series of clock pulses corresponding to the data 251. Whenever clock pulses are shown in FIG. 15 only the leading clock pulse edges are illustrated. In reality, the clock pulses typically have significant on-off duty cycles, such as a duty cycle on the order of 50 percent.

As seen in FIG. 15, each word 412, 413, 414 and 415 of the first stream 251 of binary words is accompanied by $(n+p)$ clock pulses. Since the number of clock pulses for each bit in the illustrated example is one, the series of clock pulses 417 has eight clock pulses for each binary word with parity bit of the first stream 251 of binary words.

In accordance with the subject invention, the phase lock loop of the bit synchronizer including the digital counter 276 and the voltage controlled oscillator 293 provide clock pulses for operating the parity bit remover equipment presently to be described.

In particular, the Q output of the flip-flop element 338 of the digital counter 276 of the bit synchronizer shown in FIGS. 7 and 8 provides clock pulses of the type shown at 417 in FIG. 15 for shifting, by way of a lead 361 first register means of the parity bit remover system at a first clock rate. These first register means include the shift registers 428, 428' and 428'' shown in FIGS. 9 and 10 and more fully described below.

Figure 10:
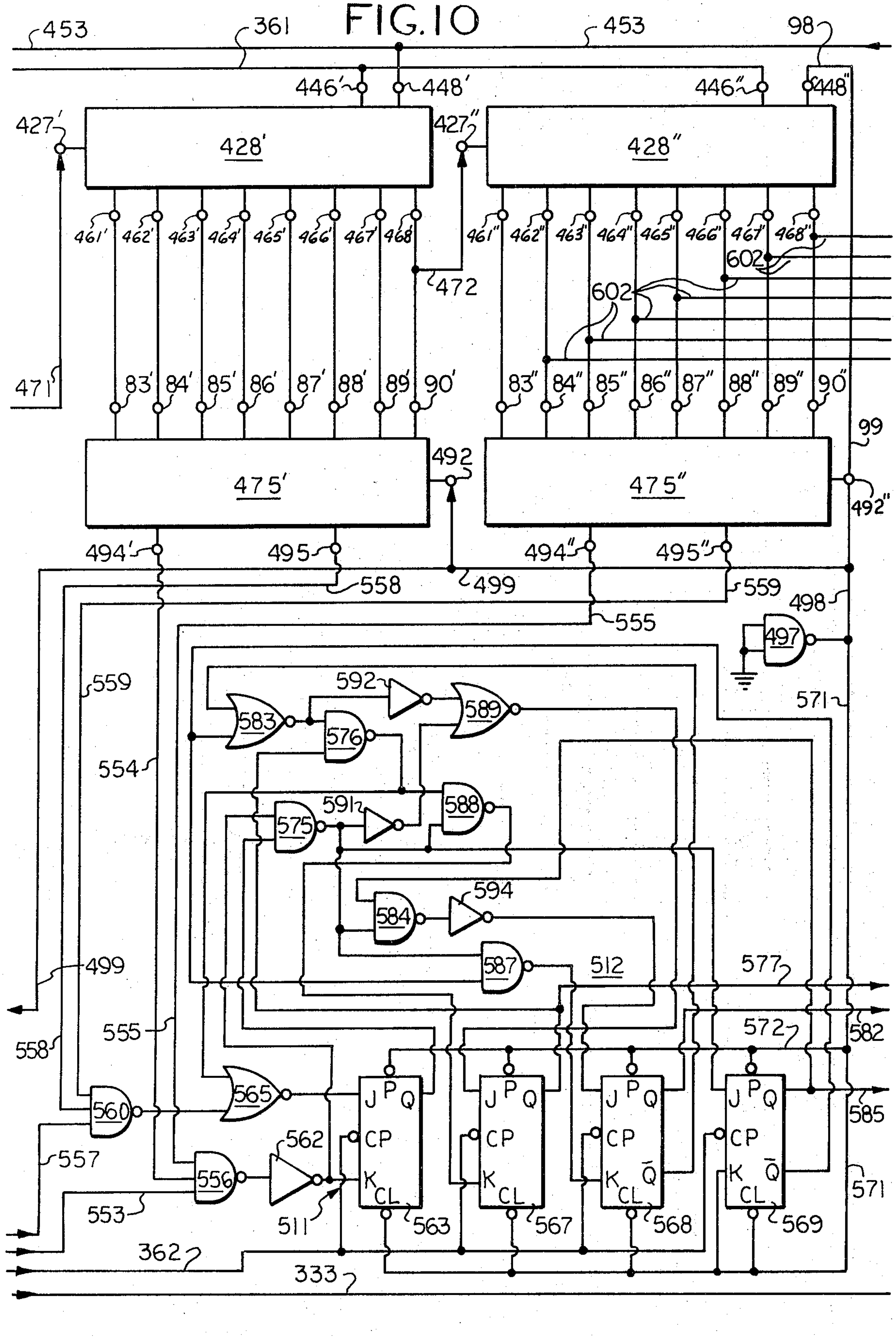

In addition, the $\bar{Q}$ output of the flip-flop element 338 of the digital counter 276 of the bit synchronizer shown in FIGS. 7 and 8 provides pulses for clocking, by way of a lead 362, a counter 511 of a sequential decoder 512 shown in FIG. 10 and forming part of the parity bit remover system.

Moreover, the voltage controlled oscillator 293 and the divider chain 325 of the bit synchronizer shown in FIGS. 7 and 8 provide, by way of the lead 333, pulses for clocking the eight counter 661 (see FIG. 11) of the parity bit remover system. As will become more fully apparent in the further course of this disclosure, one of the functions of the eight counter 661 is to provide, by way of a lead 686, clock pulses of the type shown at 419 in FIG. 15 for operating a register 581 of the parity bit remover system (see FIG. 12) at a second clock pulse rate and for providing, at a systems output 687, a second stream of clock pulses corresponding to a second stream of data having the parity bits removed therefrom.

In FIG. 15, the second stream of binary words is illustrated by a wave form 200'. In the illustrated preferred embodiment, the second series of clock pulses 419 has *n* clock pulses for each (*n*+*p*) clock pulses of the first series 417. By way of example, the second series of clock pulses 419 has seven clock pulses for each eight clock pulses of the first series 417. This may be viewed as an omission of the clock pulse which accompanied the parity bit in the first series.

As may be seen from the wave form 200' in FIG. 7, the second stream of binary words is not only characterized by an omission of the parity bits, but also by an expansion of the binary words or data into the timer periods formerly occupied by the removed parity bits. Each word 412', 413', 414' and 415' of the second stream 200' of binary words thus extends over the time interval that was in the first stream 251 occupied by the corresponding word and the accompanying parity bit. This has the great advantage that the streams of binary words are reconstituted into their original form in which there was no discontinuity between adjacent binary words.

Inventive methods and apparatus for realizing the accomplishments illustrated in FIG. 15 will now be described with the aid of FIGS. 9 through 13.

The first stream 251 of binary words with parity bits is applied from the bit synchronizer output 268 (FIG. 7) by way of a lead 400 and through a systems input terminal 427 to a first shift register 428. The shift register 428 may be of a conventional type, such as the shift register type Ser. No. 74,164, made by Texas Instruments Incorporated, of Dallas, Texas.

The shift register 428 has (*n*+*p*) set-reset stages 431, 432, 433, 434, 435, 436, 437 and 438, wherein *n* is the number of word or data bits in each word and *p* is the number of parity bits in each word, in the first stream 251 of binary words received through the input 427. In the instant case, there are seven data bits and one parity bit for each word, so that the number of set-reset stages in the shift register 428 is eight.

The register 428 has a NAND element 441 connected as an inverter for receiving the data from the systems input 427. The output of the NAND element is connected to the R-input of the first set-reset flip-flop element 431 by way of a lead 442. Conversely, the output of the NAND element 441 is connected by an inverter 443 to the S-input of the first set-reset flip-flop element 431.

To operate the shift register 428 the clock pulses received through the lead 361 and input 446, are applied to the clock or CP inputs of the flip-flop elements 431 to 438 through an inverter 447. These clock pulses belong to the first series of clock pulses 417 illustrated in FIG. 15. Actuation of the clear or CL inputs of the flip-flop elements 431 to 438 is not desired in the subject application of the shift register 428 so that the general clear input 448 of the shift register, to which the clear inputs of the elements 431 to 438 are connected by way of an inverter 449, is tied by a lead 453 to the binary "one" output of a NAND element 451, shown in FIG. 11.

The illustrated parity remover system includes two further shift registers 428' and 428'' which are identical to the shift register 428 and have input and output terminals which are identical to the input and output terminals of the shift register 428. Accordingly, the same reference numerals are used in FIG. 10 for the shift registers 428' and 428'' as for the shift register 428 in FIG. 9, except that prime (') and double-prime ('') marks are employed to distinguish the inputs and outputs of the shift registers 428' and 428'', respectively, from the inputs and outputs of the shift register 428.

Figure 9:
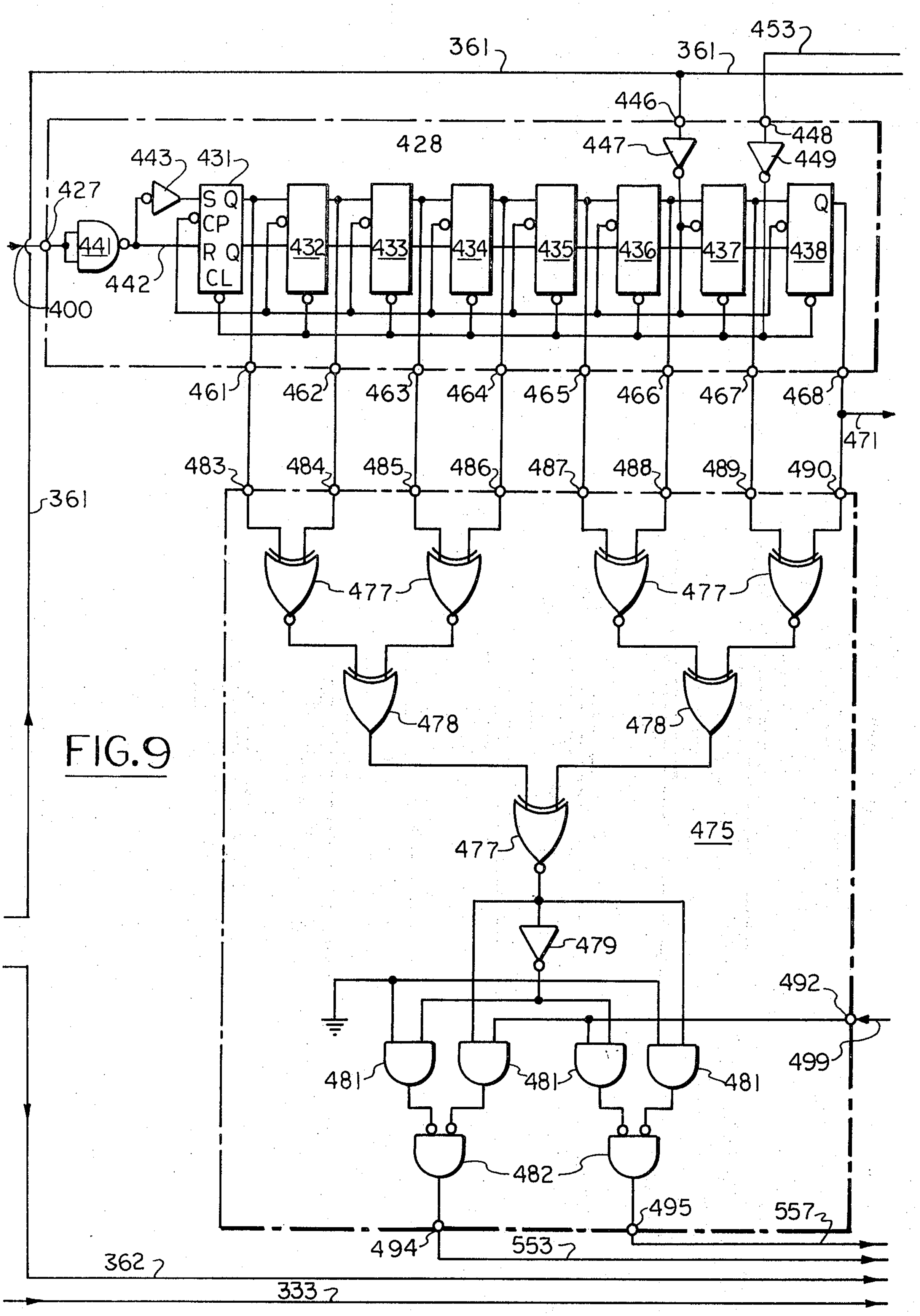
FIGS. 9 to 12 are logic diagrams jointly illustrating methods and apparatus for identifying and for removing parity bits from a continuous stream of binary words, in accordance with a preferred embodiment of the subject invention.

The shift register 428 shown in FIG. 9 has parallel outputs 461, 462, 463, 464, 465, 466, 467 and 468 at which the shifted (*n*+*p*) or (*n*+1) bits of the first data stream 251 appear. The shift registers 428' and 428'' have corresponding parallel outputs as seen in FIG. 10.

The output 468 of the shift register 428 is connected by a lead 471 to the input 427' of the shift register 428'. Similarly, the output 468' of the shift register 428' is connected by a lead 472 to the input 427'' of the shift register 428''.

In order to enable an identification of the parity bits, *m*(*n*+*p*) word and parity bits of the first data stream 251 are shifted into the registers 428, 428' and 428'' by the first series of clock pulses 417, wherein *m* is a positive integer greater than two, *n* is the number of word or data bits in a word and *p* is the number of parity bits in each word of the first data stream 10. If each word has no more than one parity bit, then it may be said that *m*(*n*+1) word and parity bits are shifted into the registers 428, 428' and 428''. It will also be observed that *m* is equal to three in the illustrated embodiment, since there are three shift registers 428, 428' and 428''.

It is to be carefully noted at this juncture that it would be incorrect to say that *m* words or, more specifically, three words are shifted into the registers 428, 428' and 428''. For this to be possible, it would be necessary that the first data stream 251 contain some identification of the word beginnings or/and endings. As can be seen from the wave form 251 in FIG. 15, no such indications are present in the data stream received from the bit synchronizer. Moreover, the shape of the parity bits is identical to the shape of the word or data bits.

Accordingly, a system is employed for identifying the parity bits without any reliance on an identification of the word as such or their beginnings and endings.

The parity bit identification system according to the subject invention includes a determination of (*n*+*p*) or (*n*+1) bits from the first stream 251 of binary words whether the number of binary "one" bits in the (*n*+*p*) or (*n*+1) bits is even or odd. Referring to the preferred example illustrated by the wave form 251 in FIG. 15, it will be recalled that the parity bit was a binary "zero" whenever the number of binary "one" word or data bits in the particular word was odd (see for instance the word 412 in FIG. 15). Conversely, the parity bit is a binary "one," whenever the number of binary "one" word or data bit in the particular word is even (see for instance the words 413, 414 and 415 in FIG. 15).

In consequence, essentially each word in the first data stream 251 has an odd number of binary "one" word and parity bits. Moreover, in the preferred system under consideration, the word or data bits are located at corresponding first locations, while the parity bits are located at corresponding second locations, in the different words of the first data stream 251.

On the basis of these facts, I have ascertained theoretically and experimentally that an identification of the parity bits is possible with the aid of a continual determination whether the binary "one" word and parity bits in any set of received $(n+p)$ or $(n+1)$ bits of the first binary stream 251 is odd or even. In particular, I effect an odd/even determination for $m(n+p)$ bits from the first stream 251 of binary words, wherein $m$ is a positive integer greater than one, $n$ is the number of binary word or data bits in each word and $p$ is the number of binary bits in each word. The latter determination is carried out by checking whether the number of binary "one" bits in any set of $(n+p)$ bits of said $m(n+p)$ bits is even or odd. In the illustrated case, the determination proceeds by checking whether the number of binary "one" bits in any set of $(n+1)$ bits of said $m(n+1)$ bits is even or odd.

The odd/even determination is preferably effected simutaneously for at least some sets of $(n+p)$ or $(n+1)$ bits of the $m(n+p)$ or $m(n+1)$ bits.

In the illustrated preferred embodiment, the means for effecting the requisite odd/even determinations include three parity checkers 475, 475' and 475'' which have identical inputs and outputs. These parity checkers which are shown in FIGS. 9 and 10, may be of a conventional type, such as the odd/even parity checker type Ser. No. 74,180 made by Texas Instruments Incorporated.

As shown in FIG. 9, the parity checkers 475, 475' and 475'' have a number of exclusive NOR elements 477, two exclusive OR elements 478, an inverter 479, a number of AND elements 481 and two NOR elements 482.

The parity checker 475 has eight inputs 483, 484, 485, 486, 487, 488, 489 and 490 which are, respectively, connected to the outputs 461, 462, 463, 464, 465, 466, 467 and 468 of the shift register 428. Corresponding connections are provided for the corresponding terminals of the parity checkers 475' and 475'' as seen in FIG. 10.

In accordance with conventional practice, each of the parity checkers 475, 475' and 475'' has an even input 492, 492' and 492'', rspectively. The parity checkers 475, 475' and 475'' further have an even output 494, 494' and 494''. The even output of a parity checker reaches a binary "one" value if the number of binary "one" bits applied to the inputs 483 to 490 or 483' to 490' or 483'' to 490'' is even. The parity checkers 475, 475' and 475'' also have an odd output 495, 495' and 495'', respectively.

The odd output of a parity checker rises to a value of a binary "one" if the number of binary "one" bits applied to the inputs 483 to 490, or 483' to 490', or 483'' to 490'' is odd.

The even inputs 492, 492' and 492'' are tied to a binary "one" potential which is supplied by a NOR element 497 by way of leads 498 and 499. The NAND element 497 is shown in FIG. 10 and the lead 499 extends over FIGS. 9 and 10.

The even outputs 494, 494' and 494'' of the parity checkers 475, 475' and 475'' are connected by leads 553, 554 and 555 to a NAND element 556. The odd outputs 495, 495' and 495'' are connected by leads 557, 558 and 559 to a NAND element 560.

The output of the NAND element 556 is connected by way of an inverter 562 to the K-input of the first J-K flip-flop element 563 of the sequential decoder. The output of the NAND element 560 is connected to an input of a NOR element 565 which has its output connected to the J-input of the flip-flop element 563.

The sequential decoder 512 has three more J-K flip-flop elements 567, 568 and 569. The clearing inputs (CL) of the flip-flop elements 563, 567, 568, and 569 are connected by a lead 571 to the output of the above mentioned NAND element 597, which provides a binary "one" signal. Similarly, the P-input of these flip-flop elements is connected by the lead 571 and by a lead 572 to the output of the NAND element 497, which remains fixed at a logic "one" level.

The output of the inverter 562 and the Q output of the flip-flop element 563 are connected to inputs of a NAND element 575. The Q output of the flip-flop element 567 is connected to an input of a NAND element 576 and also, by way of a lead 577, to inputs of further NAND elements 578 and 579 associated with the eight counter 661 shown in FIG. 11.

A lead 582 connects the Q output of the flip-flop element 568 to further inputs of the NAND elements 578 and 579. The $\bar{Q}$ output of the flip-flop element 568 is connected to an input of a NOR element 583. The Q output of the flip-flop element 569 is connected to an input of a NAND element 584 and, by way of a lead 585, to further inputs of the NAND elements 578 and 579. The $\bar{Q}$ output of the flip-flop element 569 is connected to a further input of the NOR element 583 and also to an input of a NAND element 587.

The output of the NAND element 575 in the sequential decoder 512 is connected to further inputs of the NAND elements 584 and 587, to an input of a NAND element 588, to an input of a NOR element 589 by way of an inverter 591 and to the J-input of the flip-flop element 569. The output of the NOR element 583 is connected to another input of the NAND element 576 and, by way of an inverter 592, to another input of the NOR element 589. The output of the NOR element 589, in turn, is connected to the J-input of the flip-flop element 567.

The output of the NAND element 576 is connected to inputs of the NOR element 565 and NAND element 588. The output of the NOR element 565 is connected to the J-input of the flip-flop element 563, and the output of the NAND element 588 is connected to the K-input of the flip-flop element 567. The output of the NOR element 589 is connected to the J-input of the flip-flop element 567.

The output of the NAND element 584 is connected by way of an inverter 594 to the J-input of the flip-flop element 568. The K-input of the flip-flop element 569 is also connected to the output of the NAND element 497 by way of the above mentioned lead 571.

The sequential decoder 512 cooperates with the parity checkers 475, 475' and 475'' and with the eight counter 661 (see FIG. 11) to provide a load or transfer signal to the input 596 of the register 581 whenever a loading or transfer of data from the shift register 428'' is to be effected by way of lead 602.

In the operation of the parity bit remover shown in FIGS. 9 to 12, three words are shifted into the registers 428, 428' and 428'' with the aid of clock pulses provided by the digital counter 276 of the bit synchronizer by way of the lead 361. Determinations are made with the aid of the sequential decoder 512 whether the number of binary "one" bits (word bits and parity bits) of the contents of any of the shift registers 428, 428' and 428'' is odd or is even. A consideration of FIG. 13 is helpful at this juncture with respect to the odd/even determinations. In particular, the sequential decoder 512 initially goes to a counting stage number 7 under the control of the clock pulses applied to the clock pulse (CP) inputs of the flip-flop elements 563, 567, 568 and 569 (see FIG. 10) by way of the lead 362. A determination is then made with the aid of the sequential decoder 512 whether the number of binary "one" bits in the contents of any of the shift registers 428, 428' and 428'' is even or odd. If such an odd number is found in any one or two of these shift registers 428, 428' and 428'', or in all three of these shift registers (indicated in FIG. 13 as PNE = 1), then the first seven bits of the contents of the shift register 428'' are transferred to the register 581 by way of the leads 602, and the sequential decoder 512 is reset to counting stage "zero" as indicated in FIG. 13 by an arrow between the states "7" and "zero".

On the other hand, if the number of binary "one" bits is even in the contents of all of the shift registers 428, 428' and 428'' (indicated in FIG. 13 as PNE = 0), then no transfer of data and resetting of the sequential decoder are effected. Rather, as shown in the left-hand side of FIG. 14, counting by the sequential decoder 512 is continued, until a condition PNE = 1 is sensed. At that instant, data is transferred from the register 428 to the register 581 by way of the leads 602, and the sequential deocder is reset to its "zero" condition. This is indicated by any of the arrows leading from any of the positions 8 to 15 to the "zero" position in FIG. 13. As indicated by an arrow leading from the counting state "15" back to the counting state "8", the sequential decoder 512 is reset to the eighth counting state for a renewed search mode if the condition PNE = 0 persists after the fifteenth counting step.

Figure 12:
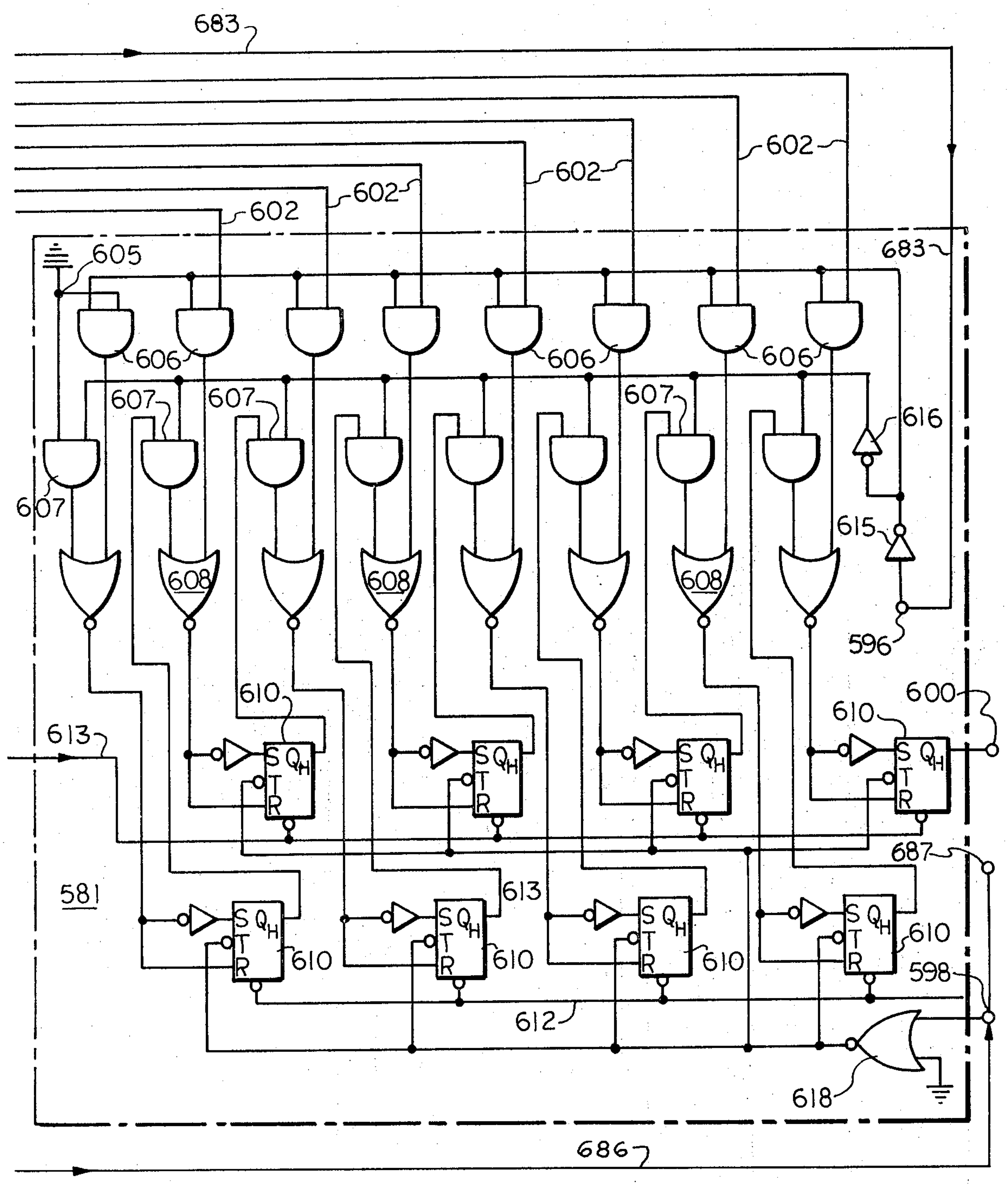
Figure 13:
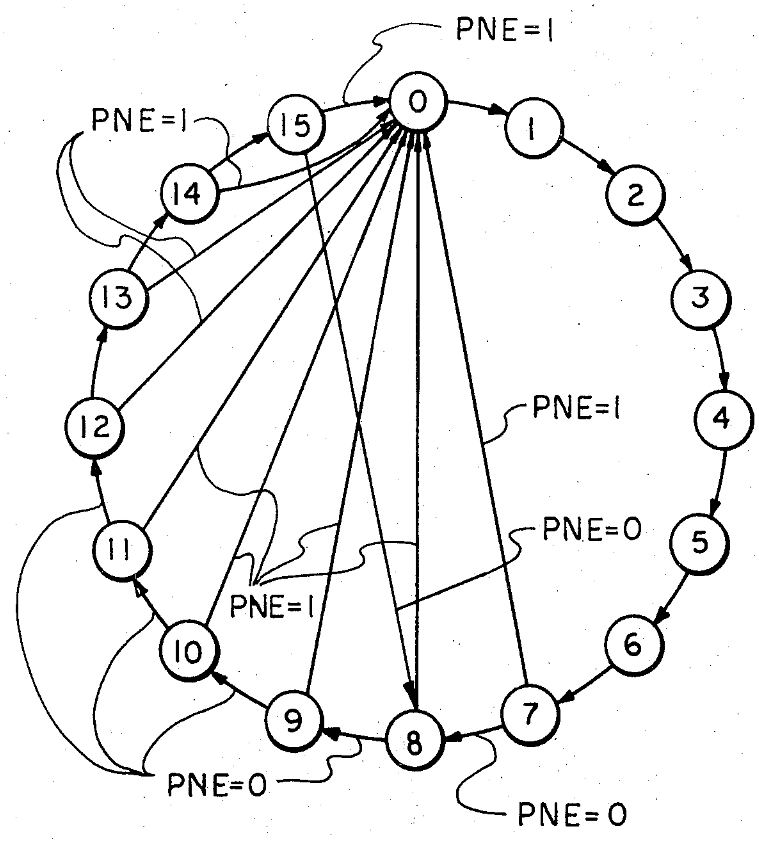
FIG. 13 is a diagrammatic chart illustrating the method of operation of part of the apparatus shown in FIG. 10.

Upon resetting of the sequential decoder 512 to the zero state in response to a determination that PNE = 1, a broadside transfer of binary bits is effected from the shift register 428'' shown in FIG. 10 to a parallel-in serial-out shift register 581 shown in FIG. 12, by way of the series of leads 602. It will be noted that no lead proceeds from the terminal 461'' of the shift register 428'' to the shift register 581. It will also be noted that the first input 605 of the register 581 of FIG. 12 is grounded. This is an important feature of the preferred illustrated embodiment in that an omission of the parity bits is thereby effected. In other words, the parity bit which is stored in the shift register 428'' in the flip-flop element corresponding to the output terminal 461'' is not transferred to the shift register 581. That this non-transferred bit is indeed the parity bit follows from the fact that the parity bits in the data stream 251 illustrated in FIG. 15 are located at corresponding locations in the words 412, 413, 414 and 415 (e.g. at the end of each word in the illustrated example). The word or data bits, on the other hand, are located at corresponding different locations.

The shift register 581 shown in FIG. 12 has a number of AND elements 606 and a number of AND elements 607. The shift register 581 further includes a number of NOR elements 608 which have their inputs connected to the AND elements 606 and 607 and which drive set-reset flip-flop elements 610 as shown. Leads 612 and 613 connect the "clear" inputs of the flip-flop elements 610 to the binary "one" output of the NAND element 451 shown in FIG. 11.

A shift/load input 596 and inverters 615 and 616 are provided to switch the register 581 for broadside transfer of data from the register 428'' to the register 581 by way of the leads 602 upon the receipt of a load signal at the input 596.

The register 581 is clocked by way of the clock input 598 and NOR element 618 by clock pulses from the second series of clock pulses 419 illustrated in FIG. 15. Since the parity bits are not transferred to the register 581 and since this register is clocked by the second series of clock pulses 419, there is provided at an output 600 of the register 581 a second continuous stream of binary words, as illustrated at 200' in FIG. 15, in which the binary words of the first stream 251 are expanded into the time periods of the removed parity bits. In other words, the stream of data bits of each word of the second stream 200' is expanded to occupy the time slots of the stream of data bits as well as the time slot of the now removed parity bit or bits of each corresponding word of the first stream 251 of binary words.

The shift register 581 may be of a conventional type, such as the parallel-in serial-out shift register Type Ser. No. 74,166 made by Texas Instruments Incorporated.

It will be noted at this juncture that the words in the second stream 200' are not necessarily in synchronism with the corresponding words in the first stream 251 in the manner shown in FIG. 15. Rather, the words in the second stream 200' may be displaced relative to the words in the first stream 251 due to normal delays occurring in practice in the operation of the illustrated equipment.

The generation of the second series of clock pulses 419 for operation of the second shift register 581 will now be described with the aid of FIG. 11. In general, the second series of clock pulses is provided by generating with the aid of the first series of clock pulses 417 a signal having a frequency equal to $bn$ times the clock pulse rate of the first series, and by generating with the aid of that signal a series of clock pulses having a pulse rate equal to $1/[b(n+1)]$, wherein $b$ is a positive number. In the illustrated preferred embodiment, this positive number is equal to one. Accordingly, the second series of clock pulses 419 is in the illustrated preferred embodiment provided by generating with the aid of the first series of clock pulses 417 a signal having a frequency equal to seven times the clock pulse rate in the first series 417, and by generating with the aid of that signal a series of clock pulses 419 having a rate equal to one-eighth times the latter frequency.

As described above, the latter frequency of seven times the clock pulse rate in the series 417 is in the illustrated preferred embodiment of the invention generated with the aid of the bit synchronizer shown in FIGS. 7 and 8. In accordance with the subject invention this saves the entire phase lock loop and frequency synthesizer that was formerly provided for the parity bit remover system itself.

As mentioned above, and as seen in FIGS. 8 to 11, the lead 333 applies the clock pulses provided by the voltage controlled oscillator 293 and the divider chain 325 of the bit synchronizer to the clock pulse (CP) inputs of the eight counter 661 shown in FIG. 11. The eight counter 661 includes J-K flip-flop elements 662, 663, and 664, NAND elements 665, 666 and 667, a NOR element 669, and inverters 671, 672 and 673, all connected as shown in FIG. 11. A modifier 675 including a further J-K flip-flop element 676 is connected to the eight counter 661 in order to synchronize the second clock pulse series 419 with the first clock pulse series 417 as far as the beginning of each binary word is concerned.

Figure 11:
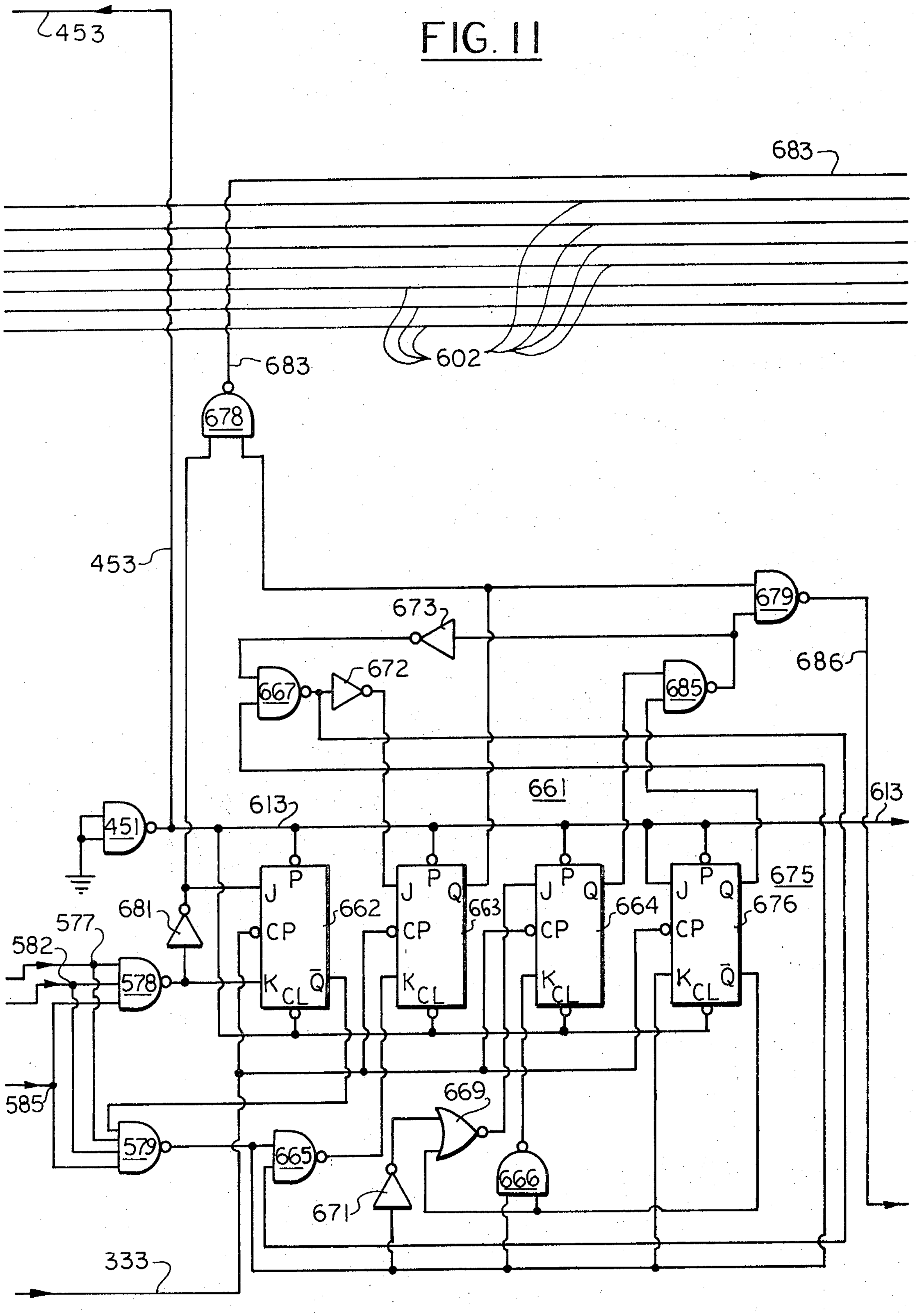

The Q output of the flip-flop element 663 of the eight counter 661 is connected to an input of a NAND element 678 and to an input of a NAND element 679, as shown in FIG. 11. The output of the NAND element 578 is connected to the K input of the flip-flop element 662 and, by way of an inverter 681, to the J input of the flip-flop element 662 and to a further input of the NAND element 678. A lead 683 applies the output of the NAND element 678 to the input 596 of the register 581 shown in FIG. 12. This output signal of the NAND element 678 is the above mentioned load or transfer signal which effects a controlled transfer of data from the shift register 428'' shown in FIG. 10 by way of the leads 602 to the register 581 shown in FIG. 12, as disclosed above.

The Q outputs of the flip-flop elements 664 and 676 of the eight counter 661 and of the modifier 675 are connected to inputs of a NAND element 685, whose output is connected to inputs of the inverter 673 and the NAND element 679. The eight counter 661 in effect divides by eight the pulse rate of the clock pulses received from the bit synchronizer by way of the lead 333. The resulting clock pulse series, illustrated at 419 in FIG. 15, is applied by the lead 686 from the output of the NAND element 679 in FIG. 11 to the clock pulse input 598 of the register 581 in FIG. 12.

Data transferred to the register 581 are serially shifted out through the systems output 600 under the control of the second series of clock pulses 419 applied to the clock pulse input 598. In this manner, the data represented by the second stream of binary words 200' in FIG. 15 are realized. The data 200' with clock pulses 419 may then be used in any desired manner and may be further decoded for a reading or other utilization of the information contained in these data.

As may be seen from FIGS. 10 and 13, the type of odd/even determination provided by the subject invention provides a considerable simplification of the sequential decoder structure and operation. Although a more complex odd/even determination and searching procedure might appear necessary at first sight, it has been verified by practical tests that the determination according to the subject invention is adequate for most applications, thereby realizing the advantages herein disclosed.

Variations and modifications within the spirit and scope of the subject invention will suggest themselves from the subject disclosure to those skilled in the art.

I claim:

1. In a method of enhancing binary transitions with the aid of a register in a first stream of binary words accompanied by a first series of clock pulses, each word having n bits and being accompanied by *n* clock pulses, the improvement comprising in combination the steps of:

providing a second series of clock pulses having $(n+1)$ clock pulses for each n clock pulses of the first series;

providing a second stream of binary words in which each binary word of said first stream is accommodated within *n* clock pulses of said $(n+1)$ clock pulses of said second series; and providing binary words in said second stream with parity bits during clock pulses outside the n clock pulses within which each binary word is accommodated in said second stream;

said second stream of binary words including said parity bits being provided by transferring each binary word of said first stream into said register, determining the parity of each binary word during transfer of that binary word into said register, providing each binary word in said register with a parity bit corresponding to the determined parity of that binary word, and shifting each binary word with parity bit out of said register with said second series of clock pulses.

2. A method as claimed in claim 1, including the steps of:

determining during the transfer of each word into said register whether the particular word has an even number or an odd number of binary bits of a predetermined kind; and providing each word in said register with a first kind of parity bit when the particular word has an even number of binary bits of said predetermined kind, and with a second kind of parity bit when the particular word has an odd number of binary bits of said predetermined kind.

3. A method as claimed in claim 1, including the steps of:

determining during the transfer of each word into said register whether the particular word has an even number or an odd number of binary ones; and providing each word in said register with a binary one as a parity bit when the particular word has an even number of binary ones, and with a binary zero as a parity bit when the particular word has an odd number of binary ones.

4. A method as claimed in claim 1, including the steps of:

providing a first shift register for processing *n* bits;

providing a second shift register for processing $(n+1)$ bits;

clocking said first shift register with said first series of clock pulses;

shifting each word in said first stream into said first shift register;

transferring the bits of each word from said first shift register to said second shift register;

determining during the transfer of the bits of each word from the first register to the second register whether the particular word has an even number or an odd number of binary bits of a predetermined kind;

providing each word in said second shift register with a first kind of parity bit when the particular word has an even number of binary bits of said predetermined kind, and with a second kind of parity bit when the particular word has an odd number of binary bits of said predetermined kind; and shifting each word with parity bit out of said second shift register with said second series of clock pulses.

5. A method as claimed in claim 1, including the steps of:

providing a first shift register for processing *n* bits;

providing a second shift register for processing $(n+1)$ bits;

clocking said first shift register with said first series of clock pulses;

shifting each word in said first stream into said first shift register;

transferring the bits of each word from said first shift register to said second shift register;

determining during the transfer of the bits of each word from the first register to the second register whether the particular word has an even number or an odd number of binary ones;

providing each word in said second shift register with a binary one as a parity bit when the particular word has an even number of binary ones, and with a binary zero as a parity bit when the particular word has an odd number of binary ones; and shifting each word with parity bit out of said second shift register with said second series of clock pulses.

6. A method as claimed in claim 5, including the steps of:

providing a parity generator having an even output circuit for generating a binary one as a parity bit in response to a determination that a binary word has an even number of binary ones;

determining with said parity generator during transfer of words from the first to the second shift register whether words have an even number or an odd number of binary ones; and providing by means of said parity generator and in said second shift register each word having an even number of binary ones with a binary one as a parity bit.

7. A method as claimed in claim 5, wherein:

said first shift register is operated as a serial-in-parallel-out shift register; and said second shift register is operated as a parallel-in-serial-out shift register.

8. A method as claimed in claim 1, wherein:

said second series of clock pulses is provided by generating with the aid of said first series of clock pulses a signal having a frequency equal to $b(n+1)$ times the clock pulse rate in said first series, and by generating with the aid of said signal a series of clock pulses having a rate equal to $1/bn$ times said frequency, wherein *b* is a positive number.

9. A method as claimed in claim 1, including the steps of:

generating with the aid of said first series of clock pulses a first signal having a frequency equal to $b(n+1)$ times the clock pulse rate in said first series;

generating with the aid of said first signal a second signal having a pulse rate equal to $1/[b(n+1)]$ times the frequency of said first signal;

employing said second signal in the generation of said first signal;

generating with the aid of said first signal a third signal having a pulse rate equal to $1/bn$ times the frequency of said first signal; and employing said third signal as said second series of clock pulses, with b being a positive number.

10. A method as claimed in claim 9, including the steps of:

providing a first shift register for processing *n* bits;

providing a second shift register for processing $(n+1)$ bits;

clocking said first shift register with said first series of clock pulses;

shifting each word in said first stream into said first shift register;

transferring the bits of each word from said first shift register to said second shift register;

determining during the transfer of the bits of each word from the first register to the second register whether the particular word has an even number or an odd number of binary bits of a predetermined kind;

providing each word in said second shift register with a first kind of parity bit when the particular word has an even number of binary bits of said predetermined kind, and with a second kind of parity bit when the particular word has an odd number of binary bits of said predetermined kind; and shifting each word with parity bit out of said second shift register with said third signal.

11. In apparatus for enhancing binary transitions in a first stream of binary words accompanied by a first series of clock pulses, each word having n bits and being accompanied by n clock pulses, the improvement comprising in combination:

means for generating a second series of clock pulses having $(n+1)$ clock pulses for each n clock pulses of the first series;

means for generating a second stream of binary words in which each binary word of said first stream is accommodated within n clock pulses of said $(n+1)$ clock pulses of said second series; and means for providing binary words in said second stream with parity bits during clock pulses outside the n clock pulses within which each binary word is accommodated in said second stream;

said means for generating a second stream of binary words including register means, means connected to said register means for transferring binary words of said first stream into said register means, and means connected to said means for generating a second series of clock pulses and to said register means for shifting each binary word with parity bit out of said register means with said second series of clock pulses; and said means for providing binary words in said second stream with parity bits including means for determining the parity of each binary word during said transfer of that binary word into said register means, and means connected to said register means and to said parity determining means for providing each binary word in said register means with a parity bit corresponding to the determined parity of that binary word.

12. An apparatus as claimed in claim 11, wherein said means for providing binary words with parity bits include:

means for determining during the transfer of each word into said register means whether the particular word has an even number or an odd number of binary bits of a predetermined kind; and means for providing each word in said register means with a first kind of parity bit when the particular word has an even number of binary bits of said predetermined kind, and with a second kind of parity bit when the particular word has an odd number of binary bits of said predetermined kind.

13. An apparatus as claimed in claim 11, wherein said means for providing binary words with parity bits include:

means for determining during the transfer of each word into said register means whether the particular word has an even number or an odd number of binary ones; and means for providing each word in said register means with a binary one as a parity bit when the particular word has an even number of binary ones, and with a binary zero as a parity bit when the particular word has an odd number of binary ones.

14. An apparatus as claimed in claim 11, wherein:

said means for generating a second stream of binary words include a first shift register for processing n bits, means for clocking the first shift register with said first series of clock pulses, means for shifting each word in said first stream into said first shift register;

said register means include a second shift register for processing $(n+1)$ bits;

said transferring means include means for transferring the bits in each word from the first shift register to the second shift register;

said parity determining means include means for determining during the transfer of the bits of each shifted word whether the particular word has an even number or an odd number of binary bits of a predetermined kind; and said parity bits providing means connected to said register means include means for providing each word in said second shift register with a first kind of parity bit when the particular word has an even number of binary bits of said predetermined kind, and with a second kind of parity bit when the particular word has an odd number of binary bits of said predetermined kind.

15. An apparatus as claimed in claim 11, wherein:

said means for generating a second stream of binary words include a first shift register for processing n bits, means for clocking the first shift register with said first series of clock pulses, means for shifting each word in said first stream into said first shift register;

said register means include a second shift register for processing $(n+l)$ bits;

said transferring means include means for transferring the bits in each word from the first shift register to the second shift register;

said parity determining means include means for determining during the transfer of the bits of each shifted word whether the particular word has an even number or an odd number of binary ones; and said parity bits providing means connected to said register means include means for providing each word in said second shift register with a binary one as a parity bit when the particular word has an even number of binary ones, and with a binary zero as a parity bit when the particular word has an odd number of binary ones.

16. An apparatus as claimed in claim 11, wherein:

said means for generating a second stream of binary words include a first shift register for processing n bits, means for clocking the first shift register with said first series of clock pulses, means for shifting each word in said first stream into said first shift register;

said register means include a second shift register for processing $(n+1)$ bits;

said transferring means include means for transferring the bits in each word from the first shift register to the second shift register;

said parity determining means include parity generator means connected to said first and second shift registers and including means for determining whether words have an even number or an odd number of binary ones; and said parity bits providing means connected to said register means include means for applying to said second register a binary one as a parity bit in response to a determination that a binary word has an even number of binary ones.

17. An apparatus as claimed in claim 11, wherein said means for generating said second series of clock pulses include:

first means for generating with the aid of said first series of clock pulses a signal having a frequency equal to $b(n+1)$ times the clock pulse rate in said first series, wherein b is a positive number; and second means connected to said first generating means for generating with the aid of said signal a series of clock pulses having a rate equal to $1/bn$ times said frequency.

18. An apparatus as claimed in claim 17, wherein:

said means for generating a second stream of binary words include a first shift register for processing n bits, means for clocking the first shift register with said first series of clock pulses, means for shifting each word in said first stream into said first shift register;

said register means including a second shift register for processing $(n+1)$ bits;

said transferring means include means connected to said second generating means for determining a predetermined state of operation of said second generating means, means connected to said means for determining said predetermined state of operation and to said second shift register for enabling a broadside transfer of binary bits from said first register to said second register in response to each determination of said predetermined state of operation, and means connected to said first and second registers for effecting said broadside transfer;

said parity determining means include means for determining during the transfer of bits of each shifted word whether the particular word has an even number or an odd number of binary bits of a predetermined kind;

said parity bits providing means connected to said register means include means for providing each word in said second shift register with a first kind of parity bit when the particular word has an even number of binary bits of said predetermined kind, and with a second kind of parity bit when the particular word has an odd number of binary bits of said predetermined kind; and said means for shifting each binary word with parity bit include means connected to said second generating means for shifting each word with parity bit out of said second shift register with said series of clock pulses having a rate equal to $1/bn$ times said frequency.

19. An apparatus as claimed in claim 11, wherein said means for generating said second series of clock pulses include:

first means for generating with the aid of said first series of clock pulses a first signal having a frequency equal to $b(n+1)$ times the clock pulse rate in said first series, wherein b is a positive number;

second means connected to said first means for generating with the aid of said first signal a second signal having a pulse rate equal to $1/[b(n+1)]$ times the frequency of said first signal;

third means connected to said first and second generating means for assisting with said second signal the generation of said first signal by said first generating means;

fourth means connected to said first means for generating with the aid of said first signal a third signal having a pulse rate equal to $1/bn$ times the frequency of said first signal.

20. An apparatus as claimed in claim 19, wherein:

said means for generating a second stream of binary words include a first shift register for processing n bits, means connected to said first shift register for clocking said first shift register with said first series of clock pulses, means connected to said first shift register for shifting each word in said first stream into said first shift register;

said register means include a second shift register for processing $(n+1)$ bits;

said transferring means include means for transferring the bits in each word from the first shift register to the second shift register;

said parity determining means include parity generator means connected to said first and second shift registers and including means for determining whether words have an even number or an odd number of binary ones; and said parity bits providing means connected to said register means include means for applying to said second register a binary one as a parity bit in response to a determination that a binary word has an even number of binary ones.

21. An apparatus as claimed in claim 20, wherein:

said second means include a seven counter; and said fourth means include an eight counter.

22. An apparatus as claimed in claim 21, wherein said means for transferring bits in each word from the first shift register to the second shift register include:

means connected to said second and fourth means for determining a first predetermined count in said seven counter and a second predetermined count in said eight counter; and means connected to said second and fourth means and to said second shift register for enabling a broadside transfer of binary bits from said first register to said second register in response to each determination of said first and second counts.

23. An apparatus as claimed in claim 20, wherein said first generating means include:

a phase detector having a first input for receiving said first series of clock pulses, a second input for receiving said second signal, and an output for providing a signal corresponding to the frequency difference between said first series of clock pulses and said second signal; and means connected to said phase detector and including voltage controlled oscillator means for generating said first signal from said difference signal.

24. An apparatus as claimed in claim 23, wherein:

said means for generating said first signal from said difference signal include amplifier means having a feedback circuit with low-pass filter means, and amplitude limiter means connected to said low-pass filter means for preventing spurious frequency locking by said voltage controlled oscillator means.

25. In apparatus for synchronizing bits of binary data, the improvement comprising in combination:

means for receiving said bits;

selectively actuable means connected to said bit receiving means for regenerating said received bits;

phase lock loop means connected to said bit receiving means for generating clock pulses synchronized with said regenerated bits, said phase lock loop means including digital counter means for generating a phase reference signal in said phase lock loop means; and means connected to said phase lock loop means for actuating said bit regenerating means during the occurrence of a center portion of each received bit and in response to said generated clock pulses and a predetermined counting state of said digital counter means.

26. An apparatus as claimed in claim 25, wherein:

said bit receiving means include means for detecting signal level edges in said received bits, means connected to said edge detecting means for generating constant time pulses in response to detected signal level edges, and means for applying said constant time pulses to said phase lock loop means.

27. An apparatus as claimed in claim 26, wherein:

said edge detecting means include first means for providing first changing signal levels in response to received bit edges, second means for providing second changing signal levels in response to received bit edges, said second means including third means for delaying said second changing signal levels relative to said first changing signal levels, and fourth means connected to said first and second means for providing edge indicative pulses in delay intervals between said first and second changing signal levels; and said contant time pulse generating means include means for generating a constant time pulse in response to each edge indicative pulse.

28. An apparatus as claimed in claim 26, wherein:

said phase lock loop means include phase detector means for providing an error signal in response to a comparison of the phases of said generated constant time pulses and of said phase reference signal, voltage controlled oscillator means for generating said clock pulses, loop filter means for applying said error signal to said voltage controlled oscillator, and means for clocking said digital counter means with said clock pulses.

29. In apparatus for synchronizing and modifying binary data, the improvement comprising in combination:

means for receiving said bits;

selectively actuable means connected to said bit receiving means for regenerating said received bits;

means connected to said regenerating means for modifying said regenerated bits;

phase lock loop means connected to said bit receiving means for generating first clock pulses synchronized with said regenerated bits, said phase lock loop means including digital counter means for generating a phase reference signal in said phase lock loop and for operating said bit modifying means;

means connected to said phase lock loop means for actuating said bit regenerating means during the occurrence of a center portion of each received bit in response to said generated first clock pulses and a predetermined counting state of said digital counter means; and means connected to said phase lock loop means for generating second clock pulses synchronized with said modified bits.

30. An apparatus as claimed in claim 29, wherein:

said bit modifying means include first register means for shifting said regenerated bits at a first clock rate, and means connected to said digital counter means for clocking said first register means; and said bit modifying means further include second register means connected to said first register means for shifting at least part of said shifted bits at a second clock rate different from said first clock rate; and said means for generating second clock pulses include further digital counter means connected between said phase lock loop means and said second register means for clocking said second register means and for providing said second clock pulses.

31. An apparatus as claimed in claim 30, wherein:

said bit receiving means include means for detecting signal level edges in said received bits, means connected to said edge detecting means for generating constant time pulses in response to detected signal level edges, and means for applying said constant time pulses to said phase lock loop means.

32. An apparatus as claimed in claim 30, wherein:

said phase lock loop means include phase detector means for providing an error signal in response to a comparison of the phases of said generated constant time pulses and of said phase reference signal, voltage controlled oscillator means for generating said clock pulses, loop filter means for applying said error signal to said voltage controlled oscillator, and means for clocking said digital counter means with said clock pulses.

33. In apparatus for synchronizing and removing parity bits from binary words including parity bits, the improvement comprising in combination:

means for receiving said bits including parity bits;

selectively actuable means connected to said bit receiving means for regenerating said received bits including said parity bits;

means connected to said bit regenerating means for identifying parity bits in said regenerated bits;

means for removing identified parity bits from said regenerated bits;

means connected to said removing means for expanding said regenerated bits from which parity bits have been removed into the time periods of the removed parity bits;

phase lock loop means connected to said bit receiving means for generating first clock pulses synchronized with said regenerated bits including said parity bits, said phase lock loop means including digital counter means for generating a phase reference signal in said phase lock loop and for operating said parity bit identifying means;

means connected to said phase lock loop means for actuating said bit regenerating means in response to said generated clock pulses and a predetermined counting state of said digital counting means; and means connected to said phase lock loop means for operating said expanding means and for generating second clock pulses synchronized with said expanded bits.

34. An apparatus as claimed in claim 33, wherein:

said means for actuating said bit regenerating means include means for actuating said bit regenerating means only during the occurrence of a center portion of each received bit.

35. An apparatus as claimed in claim 33, wherein:

said means for operating said expanding means and for generating said second clock pulses include further digital counter means connected between said phase lock loop means and said expanding means.

36. An apparatus as claimed in claim 33, wherein:

said parity bit identifying means include means for determining for $m(n+p)$ bits of said received bits whether the number of binary "one" bits in any set of $(n+p)$ bits of said $m(n+p)$ bits is even or odd, wherein m is a positive integer greater than one, $n$ is the number of word bits in each of said binary words, and $p$ is the number of parity bits in each of said binary words; and said parity bit removing means include means for transferring in response to said determination only n bits from each set of $(n+p)$ bits of said $m(n+p)$ bits.

37. An apparatus as claimed in claim 36, wherein:

said parity bit identifying means include means for effecting said determination simultaneously for at least some sets of $(n+p)$ bits of said $m(n+p)$ bits.

* * * * *